United States Patent
Bourlas et al.

(10) Patent No.: US 6,577,863 B2
(45) Date of Patent: Jun. 10, 2003

(54) FAILURE REDUNDANCY BETWEEN MODEM INTERFACE CARDS AND OUTDOOR UNITS IN A WIRELESS COMMUNICATION SYSTEM

(75) Inventors: Yair Bourlas, San Diego, CA (US); Sheldon L. Gilbert, San Diego, CA (US); Siddharth R. Ram, San Diego, CA (US)

(73) Assignee: Ensemble Communications, Inc., San Diego, CA (US)

( * ) Notice: Subject to any disclaimer, the term of this patent is extended or adjusted under 35 U.S.C. 154(b) by 44 days.

(21) Appl. No.: 09/788,284

(22) Filed: Feb. 15, 2001

(65) Prior Publication Data

US 2002/0111161 A1 Aug. 15, 2002

(51) Int. Cl.$^7$ ................................................ H04Q 7/20
(52) U.S. Cl. ....................................... 455/424; 455/561
(58) Field of Search ................................ 455/423, 424, 455/550, 561, 562, 8; 379/1.01, 2; 370/216, 217

(56) References Cited

U.S. PATENT DOCUMENTS

| | | |
|---|---|---|
| 3,949,404 A | 4/1976 | Fletcher et al. |
| 4,495,619 A | 1/1985 | Acampora |
| 5,297,144 A | 3/1994 | Gilbert et al. |
| 5,420,851 A | 5/1995 | Seshadri et al. |
| 5,444,698 A | 8/1995 | Kito |
| 5,511,082 A | 4/1996 | How et al. |
| 5,615,212 A | 3/1997 | Ruszczyk et al. |
| 5,638,371 A | 6/1997 | Raychaudhuri et al. |
| 5,638,374 A | 6/1997 | Heath |
| 5,675,573 A | 10/1997 | Karol et al. |
| 5,751,708 A | 5/1998 | Eng et al. |
| 5,768,254 A | 6/1998 | Papadopoulos et al. |
| 5,815,798 A * | 9/1998 | Bhagalia et al. ............ 455/422 |
| 5,828,695 A | 10/1998 | Webb |
| 5,859,619 A | 1/1999 | Wu et al. |
| 5,890,055 A | 3/1999 | Chu et al. |
| 6,006,069 A | 12/1999 | Langston |
| 6,016,311 A | 1/2000 | Gilbert et al. |
| 6,016,313 A | 1/2000 | Foster, Jr. et al. |
| 6,038,455 A | 3/2000 | Gardner et al. |
| 6,094,421 A | 7/2000 | Scott |
| 6,112,080 A | 8/2000 | Anderson et al. |
| 6,418,327 B1 * | 7/2002 | Carey et al. ................. 455/562 |

OTHER PUBLICATIONS

Lin., et al., "Error Control Coding, Fundamentals and Applications", Prentice–Hall Computer Applications in Electrical Engineering Series., 1993, pp. 315–349.

(List continued on next page.)

Primary Examiner—Vivian Chin
Assistant Examiner—James K Moore
(74) Attorney, Agent, or Firm—Knobbe Martens Olson & Bear, LLP

(57) ABSTRACT

A system that provides a redundant wireless broadband connection between a base station and customer sites is described. The system includes a redundancy system, for example, a standby modem interface card and a plurality of standby outdoor units that are incorporated into the base station. Upon receiving a fault message from a base station component, the redundancy system performs fault correlation to determine whether the fault is indicative of a system level fault. The system also determines whether the fault message affects system operation and performs a switch over based on the determination.

66 Claims, 12 Drawing Sheets

OTHER PUBLICATIONS

L.H. Charles Lee, "Convolutional Coding, Fundamentals and Applications", Artech House, Inc., 1997, p. 11–51.

Redl, et al., "An Introduction to GSM", Artech House, Inc., 1995; pp. 84, 85 and 95.

C.E. Shannon, "A Mathematical Theory of Communication", Bell System Technical Journal, pp. 379–423 (Part 1), 623–656 (Part II), Jul. 1948.

Ulm., et al., "Data–Over–Cable Interface Specifications, Radio Frequency Interface Specification", Hewlett Packard Interim Specification, Doc. Control No.: SP–RFII01–970321, published Mar. 21, 1997 by MCNS Holdings, L.P., section 6, pp. 43–85.*

Wolf, et al., "On the Weight Distribution of Linear Block Codes Formed From Convolutional Codes", IEEE, IEEE Transcactions on Communications, vol. 44:9, Sep. 1996.*

"Asynchronous Transfer Mode (ATM) Technical Overview", $2^{nd}$ Edition, Prentice Hall, Oct. 1995, Chapter 3, pp. 21–25.*

* cited by examiner

FAILURE REDUNDANCY BETWEEN MODEM INTERFACE CARDS AND OUTDOOR UNITS IN A WIRELESS COMMUNICATION SYSTEM

BACKGROUND OF THE INVENTION

1. Field of the Invention

This invention relates to wireless communication systems, and more particularly to a wireless communication system with native redundancy, which provides improved data connectivity to a plurality of customers.

2. Description of Related Art

Several systems are currently in place for connecting computer customers to one another and to the Internet. For example, many companies such as Cisco Systems, provide data routers that route data from personal computers and computer networks to the Internet along conventional twisted pair wires and fiber optic lines. These same systems are also used to connect separate offices together in a wide area data network.

However, these systems suffer significant disadvantages because of the time and expense required to lay high capacity communications cables between each office. This process is time consuming and expensive. What is needed in the art is a high capacity system that provides data links between offices, but does not require expensive communication cables to be installed.

Many types of current wireless communication systems facilitate two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit customer with the fixed network infrastructure (usually a wired-line system). Several types of systems currently exist for wirelessly transferring data between two sites. For example, prior art wireless communication systems have typically used a Code Division Multiple Access (CDMA), Time Division Multiple Access (TDMA) or Frequency Division Multiple Access (FDMA) type system to facilitate the exchange of information between two customers. These access schemes are well known in the art.

As can be imagined, in any of these types of wireless communication systems there are many components within the system that may fail at any time and result in the communication link being lost. When a single point failure occurs, the subscriber is unable to connect or continue sending information through the data channel to the base station. Should this repeatedly occur, for example in a system with a low mean time between failures ("MTBF"), the subscriber may become dissatisfied with their wireless communication system and discontinue the service.

Traditionally, to overcome a potential system failure and maintain high subscriber satisfaction, redundant or back-up components are incorporated into the wireless communication system. While these additional components may improve the wireless communication system's MTBF, significant costs are incurred in incorporating the components. Often, nearly a one to one ratio of primary components to backup components is used to ensure a single point failure will not occur. However, even when back-up components are used, the complexity of the wireless communication system is further exacerbated since once a failure does occurs, elaborate switching and hand-offs must be designed into the wireless communication system to reestablish the data link with the remaining primary components.

Consequently, a need remains for a wireless communication system without the complexity of incorporating multiple redundancy system while maintaining the system reliability demanded by today's high technology subscriber. It is also desirable to provide a system for switching around a failed component without requiring elaborate switching and hand-offs between the primary and back-up components.

SUMMARY OF THE INVENTION

The systems and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide several advantages over traditional paper coupon systems.

Another aspect of the invention is a redundancy system of primary components and standby components comprising a plurality of primary modem interface for modulating/demodulating data transmitted between a base station and a customer, a plurality of primary outdoor units wherein each of the primary outdoor units is in data communication with one of the plurality of primary modem interface wherein each of the primary outdoor units comprises a transceiver for transmitting and receiving data from the customer, a standby modem interface for modulating/demodulating data transmitted between the base station and the customer, a plurality of standby outdoor units each comprising a second transceiver for transmitting and receiving data from the customer, wherein the plurality of standby outdoor units is in data communication with the standby modem interface, and wherein each of the plurality of standby outdoor units is configured to replace one of the plurality of primary outdoor units, a redundancy card comprising a selectable switch wherein the selectable switch is in communication with the standby modem interface and the plurality of standby outdoor units to allow data communication between the standby modem interface and one of the plurality of standby outdoor units whereby data communication is maintained between the customer and the base station when one of the plurality of primary modem interfaces or one of the plurality of primary outdoor units is unavailable.

One aspect of the present invention is a method of using a redundancy system of primary components and standby components in a wireless communication system. The method includes receiving a fault message from an originating primary component, correlating the fault message with additional primary components in the wireless communication system, determining whether the fault message affects system level operation, and switching over from the originating primary component to a standby component based on said determination.

DETAILED DESCRIPTION OF THE INVENTION

The following detailed description is directed to certain specific embodiments of the invention. However, the invention can be embodied in a multitude of different systems and methods. In this description, reference is made to the drawings wherein like parts are designated with like numerals throughout.

Figure 1:
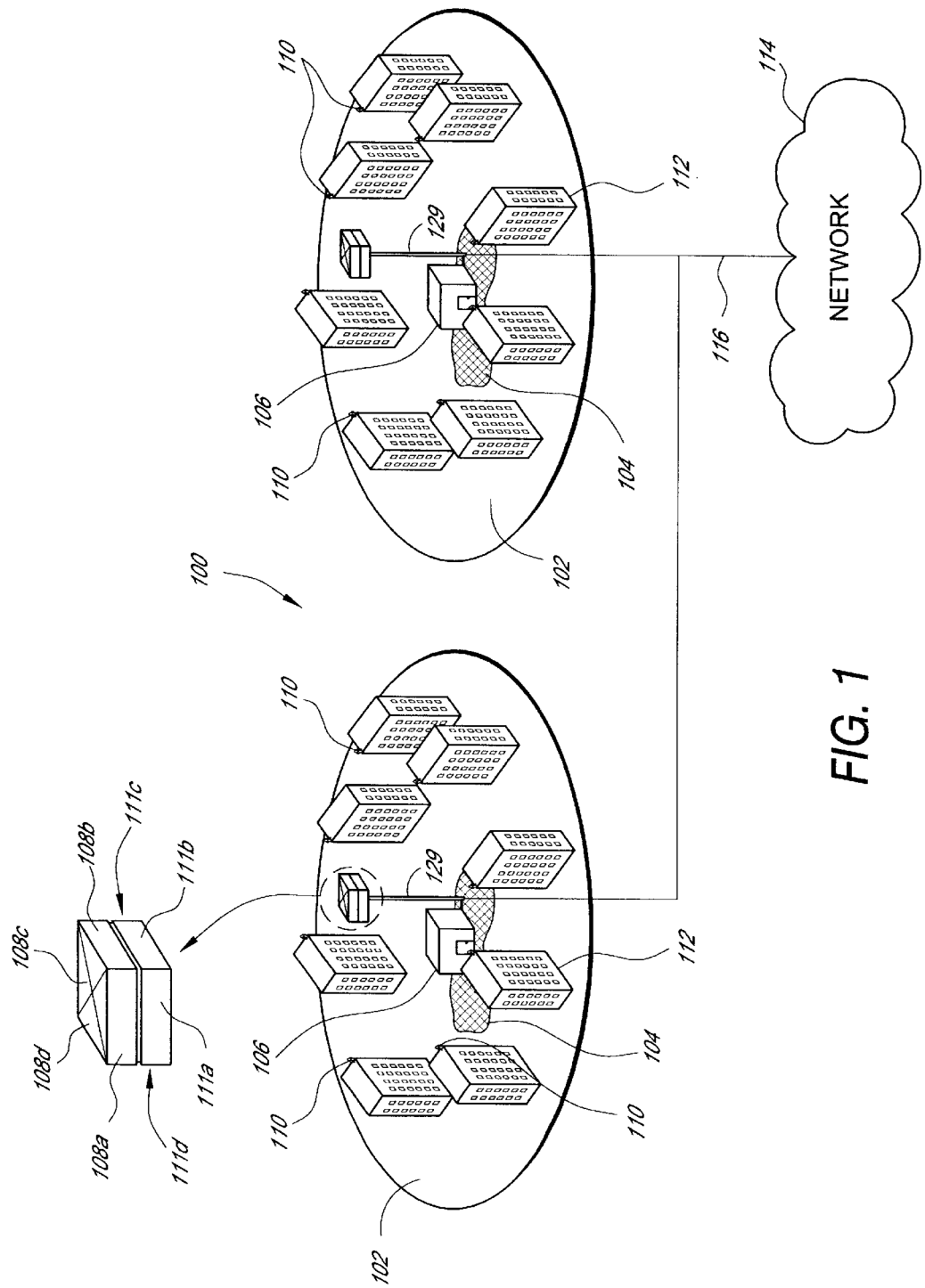
FIG. 1 is a block diagram of an exemplary broadband wireless communication system for use with the present invention.

As described above, aspects of the present invention relate to a failure redundancy system for a broadband wireless communication system. One such system in which the failure redundancy system can be incorporated is described in U.S. Pat. No. 6,016,311 issued to Gilbert et al titled ADAPTIVE TIME DIVISION DUPLEXING METHOD AND APPARATUS FOR DYNAMIC BANDWIDTH ALLOCATION WITHIN A WIRELESS COMMUNICATION SYSTEM, hereby incorporated by reference. FIG. 1 is a high level block diagram illustrating a wireless communication system 100. The wireless communication system 100 provides a wireless link with customers and businesses to share data or access a network 114, for example, the Internet. The wireless communication system 100 comprises a plurality of cells 102. Each cell 102 contains a base station 104 and a plurality of customer premises equipment (CPE) 110 located at fixed customer sites 112 throughout the coverage area of the cell 102. Each CPE 110 communicates with the base station 104 over a wireless link. The base station 104, in turn, communicates with the network 114 using a communication link or "backhaul" 116. The backhaul 116 can comprise, for example, a fiber-optic cable, a microwave link, or other high throughput connection.

Figure 2:
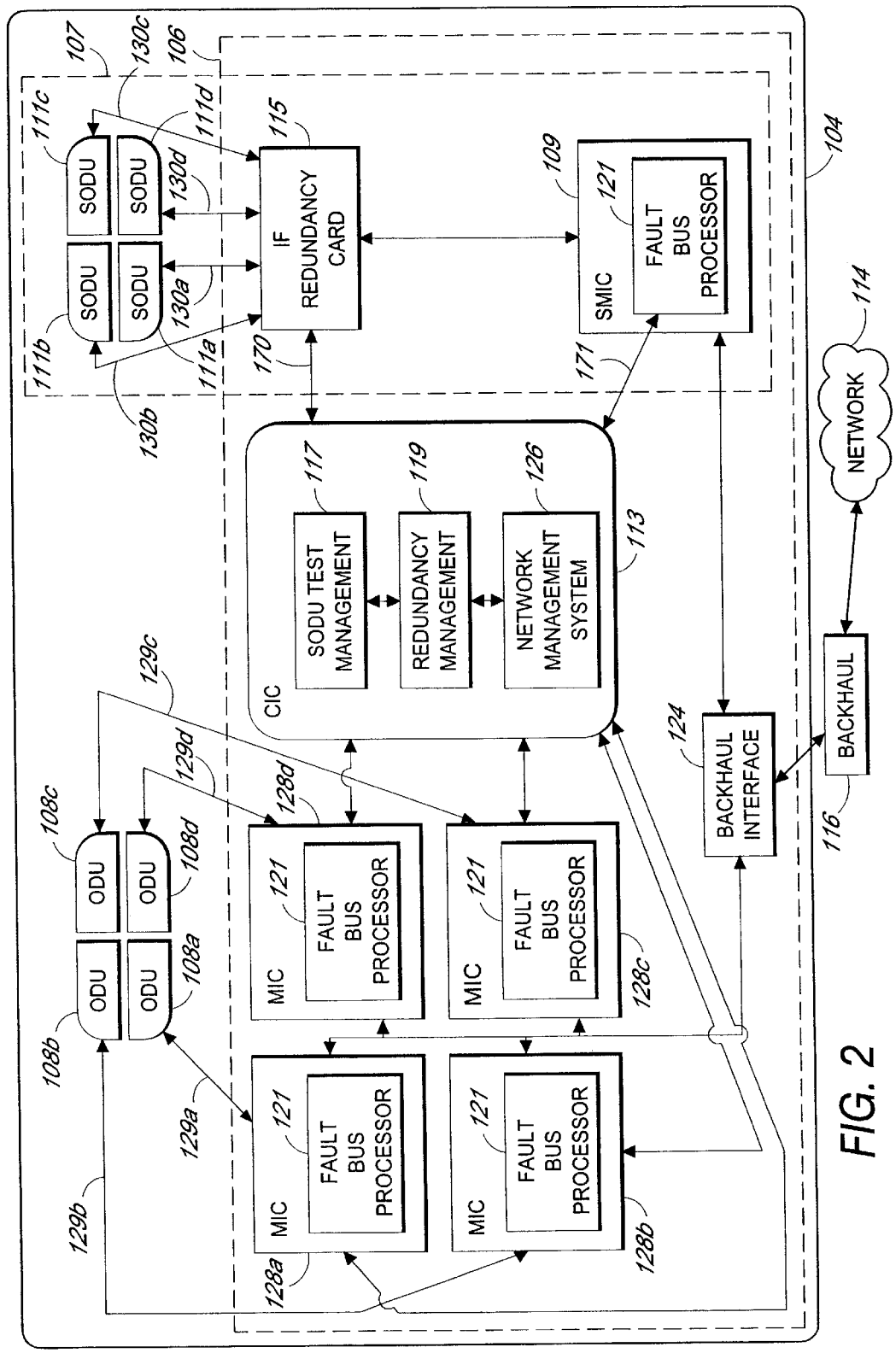
FIG. 2 is a block diagram of a Base Station used in the wireless communication system of FIG. 1 showing primary components and redundancy components.

FIG. 2 illustrates a detailed block diagram of the base station 104 of FIG. 1. The base station 104 includes an IDU 106 and an ODU 108. As shown in FIG. 1, there may be a group of outdoor units 108a, 108b, 108c, 108d, through 108n. Each ODU in the group of ODUs 108(a–n) may then be oriented to receive and transmit customer data in a particular sector of the coverage area of the cell 102. In one embodiment, multiple ODUs 108 from the group of ODUs 108(a–n) are oriented in the same sector. As shown in FIG. 2, the base station 104 further includes at least one standby outdoor unit (sODU) 111(a). The sODU 111, similar to the ODU 108, may represent a group of standby outdoor units 111a, 111b, 111c, 111d, through 111n. In one embodiment, each sODU in the group of sODUs 111(a–n) may then be oriented to receive and transmit customer data in a particular sector of the coverage area of the cell 102. As mentioned above, since one embodiment includes multiple ODUs 108 oriented in the same sector, only one sODU 111(a) oriented to that particular sector would be required to protect those ODUs 111. Thus, the ODUs 111(a–n) are protected in a N:1 fashion. In one embodiment, the ODU 108 and sODU 111 are external to the IDU 106 which allows the IDU 106 to be located within a building.

Still referring to FIG. 2, one embodiment of the base station IDU 106 includes at least one modem interface card (MIC) 128, a controller interface card (CIC) 113, an IF redundancy card 115, a standby modem interface card (sMIC) 109, and a backhaul interface 124. As shown in FIG. 2, the sODU 111, the IF redundancy card 115, and the sMIC 109 in the base station 104 together form a redundancy system 107 within the wireless communication system 100 which will be further discussed below.

As shown in FIG. 2, each MIC 128 communicates with one ODU 108 over a communication link 129(a–n) to form a MIC 128/ODU 108 pair. For example, MIC 128(a) communicates with ODU 108(a), MIC 128(b) communicates with ODU 108(b), and MIC 128(n) communicates with ODU 108(n) to form pairs of MIC/ODUs. Each MIC/ODU 128, 108 pair transmits and receives customer data between the fixed customer sites 112 and the backhaul interface 124. In one embodiment, each MIC/ODU 128, 108 pair transmits in sectorization ranges from 3 to 90 degrees. This format provides the base station 104 with, for example, 10, 20, 30 or more MIC/ODU 128, 108 pairs that each communicate with the fixed customer sites 112 in a specific sector. In addition, ODU's 108 can transmit in the same sectors using different frequencies or sharing common frequencies. In one embodiment, each MIC 128 provides modem and control functions. Each ODU 108 up connects and transmits signals from the modem of the associated MIC 128 and receives and down connects signals from CPE's 110 with the down converted signals being provided to the MIC 128. Such a system is described in more detail in U.S. patent application Ser. No. 09/706,165 filed Nov. 3, 2000 titled OUTDOOR UNIT/INDOOR UNIT INTERFACE PROTOCOL, hereby incorporated by reference.

Each MIC 128 further includes a fault bus processor 121, which monitors the performance of the MIC/ODU 128, 108 pair and communicates any faults to the controller interface card (CIC) 113.

Still referring to FIG. 2, the controller interface card (CIC) 113 includes an sODU test management module 117, a redundancy management module 119, and a Network Management System (NMS) 126. A detailed description of the sODU test management module 117, the redundancy management module 119, and the Network Management System (NMS) 126 is provided below. In one embodiment, program logic, or other substrate configuration representing data and instructions, may advantageously be implemented as one or more modules.

The term "module," as used in the Detailed Description, means, but is not limited to, a software or hardware component, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

As mentioned above, some of the components in the base station 104 together form the redundancy system 107, which compensates for failures of MIC/ODU 128, 108 pairs. When activated, the redundancy system 107 forms a replacement link between the backhaul interface 124 and the customer premises equipment 110.

As shown in FIG. 2, one embodiment of the redundancy system 107 comprises at least one standby modem interface card (sMIC) 109 in communication with a plurality of sODUs 111(a–n) through the IF redundancy card 115. This allows, for example, the sMIC 109 to form an sMIC/sODU 109, 111 pair with one of the sODU. Each sMIC/sODU 109, 111(a–d) pairing can transmit and receive customer data between the fixed customer sites 112 and the backhaul interface 124. In one embodiment, each pairing of sMIC/sODU 109, 111 transmits in different sectors. In another embodiment, the sODU 111 includes a single sODU 111 that transmits and receives in a single sector. As mentioned above, the plurality of ODU 108(a–n) may transmit and receive in a single sector whereby the single sODU 111 would provide adequate redundancy for the wireless communication system 100.

However, as shown in FIG. 2, each one of the plurality of sODU's 111(a–d) is configured to functionally replace one ODU 108, whereby a one-to-one correlation between a failed ODU 108 and the sODU 111 is maintained. In embodiments where the redundancy system 107 comprises multiple sMICs 109 and their associated plurality of sODUs 111(a–n), multiple levels of redundancy are achieved. The redundancy system 107 will replace both a failed MIC 128(a) and its ODU 108(a) or a failed ODU 108(a) and its MIC 128(a). For example, if the ODU 108(a) failed, the sODU 111(a) along with the sMIC 109 would come on line to replace the failed ODU 108(a) and its MIC 128(a). Therefore, though only four ODU's and sODU's are depicted, in this example, it should be recognized that the number would vary depending on system requirements.

Two of the components of the redundancy system 107, the IF redundancy card 115 and the sMIC 109, are both shown in FIG. 2 as being located in the IDU 106. One skilled in the art will appreciate that these components may be located in a multitude of arrangements besides being together in the IDU 106. Similarly, the sODU 111 is shown as being distinctly located away from the ODU 108; however, one skilled in the art will appreciate that their respective locations may be arranged in a multitude of different ways. In one embodiment illustrated in FIG. 1, the ODU 108(a–d) and sODU 111(a–d) are located adjacent to one another and share the same vertical axis.

Now returning to FIG. 2, the sMIC 109, in the redundancy system 107, includes multiple components, of which only the fault bus processor 121 is shown in FIG. 2. The additional components of the sMIC 109 will be discussed below in conjunction with its detailed description. Similarly to the fault bus processor 121 located in the MIC 128, the fault bus processor 121 in the sMIC 109 also sends fault messages to the controller interface card (CIC) 113. The fault messages sent from the fault bus processor 121 in the sMIC 109 monitor the performance of the redundancy system 107.

Operation of the Redundant Wireless Communication System

The following discussion provides an overview of the operation of the redundancy system 107 described above. Detail process flow charts and descriptions are provided below.

Referring to FIG. 2, when the base station 106 is in receive mode, the wireless modulated carrier signal, sent by the customer premises equipment 110 in a sector of the cell 102, is received by the ODU 108 that is designated to cover that sector, for example ODU 108(a). The signal is subsequently processed down to an intermediate frequency prior to its demodulation. In one embodiment, the processing of the signal into the intermediate frequency is performed by the ODU 108(a) before it is sent to the MIC 128(a). Once the intermediate frequency is obtained, the signal is then demodulated and decoded by the MIC 128(a). The resulting customer data is then communicated through the backhaul interface 124 to the network 114. The base station 104 transmission mode is similar to the receive mode described above except that the steps are performed in reverse order.

If a failure event is detected in the system, for example a fault message from the fault bus processor 121 on MIC 121(a) is received by the controller interface card (CIC) 113 indicating a critical task failure has occurred, the CIC 113 will reroute the customer data away from MIC 128(a) and its ODU 108(a). The CIC 113 will then activate the sODU 111 that correlates to the sector covered by ODU 108(a), for example sODU 111(a), along with the sMIC 109. Once the sODU 111(a) and the sMIC 109 are activated, the CIC will route the customer data to the sMIC/sODU 109, 111(a) pair. The sMIC/sODU 109, 111(a) pair will transmit and receive the customer data between the base station 104 and the CPE 110 in the sector that was covered by the failed MIC/ODU 128(a), 108(a). Once the failed MIC/ODU 128(a), 108(a) becomes operational again, the redundancy system 107 can be deactivated and return to a standby mode.

Modem Interface Card and Standby Modem Interface Card

One example of the modem interface card (MIC) is described in detail in U.S. patent application Ser. No. 09/721,416 filed Nov. 22, 2000 titled TIMING OF COMMANDS ON OUTDOOR UNIT FSK LINK TO PROVIDE FRAME SYNC AT OUTDOOR UNIT IN TIME DIVISION DUPLEX SYSTEM and Ser. No. 09/706,165 filed Nov. 3, 2000 titled OUTDOOR UNIT/INDOOR UNIT INTERFACE PROTOCOL, both hereby incorporated by reference. Furthermore, in one embodiment, the standby modem interface card (sMIC) 109 is substantially identical to the MIC 128 whereby the incorporated description would also apply to the sMIC 109.

Figure 3:
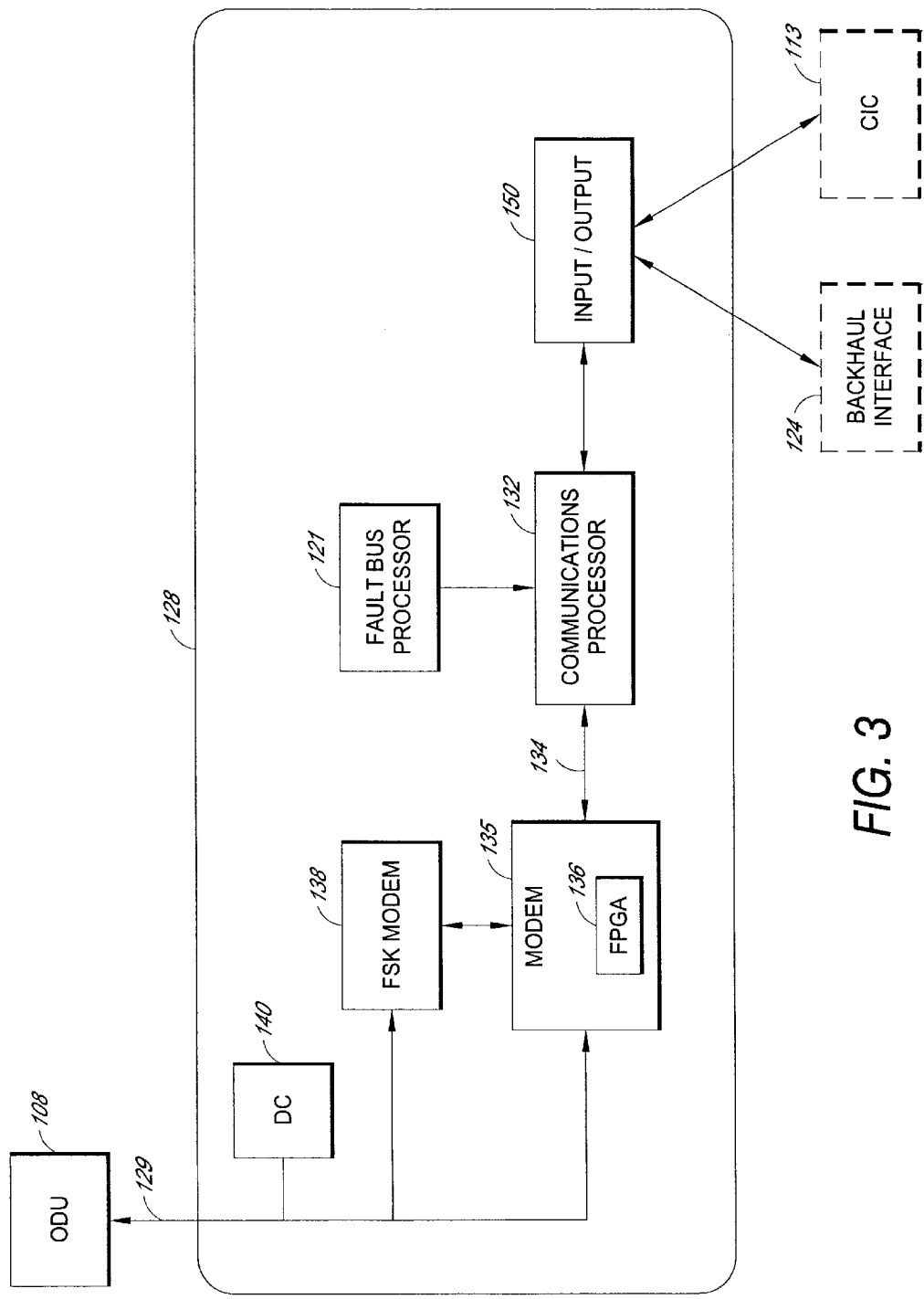
FIG. 3 is a block diagram of an embodiment of a Modem Interface Card (MIC) module from the Base Station illustrated in FIG. 2.

Referring now to FIG. 3, a more detailed block diagram of the MIC 128 from FIG. 2 is provided. For simplicity, only the MIC 128 will be discussed. Since in one embodiment, the MIC 128 and sMIC 109 are substantially identical, the following discussion would also apply to the sMIC 109. However, until the redundancy system 107 is activated, the sMIC 109, unlike the MIC 128, is in a standby mode.

In one embodiment of the wireless communication system 100, each MIC 128 includes an input/output port 150, a communications processor 132, a modem 135 for modulating/demodulating customer data, a bus 134 coupling the communications processor 132 with the modem 135, such as a Power PC bus, a Frequency Shift Key (FSK) modem 138 for modulating/demodulating ODU 108 commands and responses, and a fault bus processor 121. In one embodiment, these components are incorporated into a single card allowing the MIC 128 to be rack mounted in an IDU box, which is a standard size box used in the art. This arrangement further permits the MIC 128 to be hot plugable, which eases servicing and allows for growth. One in the art will recognize that these components may alternatively be arranged between multiple boards in multiple locations.

In one embodiment, the IDU box accommodates up to ten MICs 128. This configuration allows the wireless communication system 100 to use nine channels, one per MIC 128, to carry user data while one channel is allocated for the sMIC 109. In another embodiment, each of the nine MICs 128 has dual channels which allows the wireless communication system 100 to use nineteen channels to carry user data while one channel is allocated for the sMIC 109. In this embodiment, each channel of the dual channel MIC 128 operates independently of each other. Thus, in this embodiment, the wireless communication system 100 can support up to nineteen channels with network 114 interfaces ranging from a single T3/E3 line up to multiple OC-3s/STM-1s lines. As one who is skilled in art would recognize, single and dual channel MICs 128 and/or sMICs 109 may be combined to create variations of the schemes described above. For example, in one embodiment, two single channel sMICs 109 provide redundancy for a failed dual channel MIC 128. Additionally, multi-channel MICs 128 and sMICs 109 with various numbers of channels can be employed.

In one embodiment, each MIC 128 is under the control of the communications processor 132. As illustrated in FIG. 3, the communications processor 132 is linked to the input/output port 150 that attaches to the backhaul interface 124 and the controller interface card 113 (FIG. 2). The communications processor 132 receives packet data from the input/output port 150 and transmits it to the modem 135 for modulation/demodulation before being sent to the ODU 108 through a broadband cable 129, such as provided by an RG-6 cable. The communications processor 132 monitors the quality of the received packet data. The communications processor 132 connects through the bus 134 to the modem 135. The modem 135 can include a Field Programmable Gate Array (FPGA) 136 that stores instructions for controlling other subcomponents of the MIC 128. For example, the FPGA 136 communicates with the Frequency Shift Key (FSK) modem 138 in order to send FSK modulated control messages from the MIC 128 through the cable 129, to the ODU 108. Similarly, the ODU 108 responds with response messages.

Referring to FIGS. 2 and 3, one of the fault bus processors 121 is shown located in each MIC 128. The fault bus processor 121 reports faults, native to its MIC 128, to the redundancy management module 119 in the CIC 113 for further analysis as described below.

Outdoor Unit and Standby Outdoor Unit

The outdoor unit (ODU) 108 is described in detail in U.S. patent application Ser. No. 09/706,335 filed Nov. 3, 2000 titled FIXED INTERMEDIATE FREQUENCY IS ACHIEVED USING A VARIABLE LO FIXED SOURCE AND A VARIABLE OSCILLATOR, hereby incorporated by reference. Furthermore, in one embodiment, the standby outdoor unit (sODU) 111 is substantially identical to the ODU 108 whereby the incorporated description would also apply to the sODU 111.

In one embodiment, the ODU 108 and sODU 111 each include an integrated broadband antenna (not shown) for transmitting/receiving wireless customer data packets to/from the customer sites 112. As discussed above in reference to the MIC 128, each MIC/ODU 128, 108 pair communicates with one another through the broadband cable 129 shown in FIG. 3. As shown in FIG. 2, the sODU 111(a–d) and the sMIC 109 also communicate with one another through a broadband cable connection 130(a–d) via the IF redundancy card 115. Lastly, as illustrated in FIG. 3, power is provided to the ODU 108 through a DC power supply 140.

As shown in FIGS. 1 and 2, one embodiment of the wireless communication system 100 has each ODU 108 and sODU 111 located outside of the building containing the base station 106. One skilled in the art will recognize the locations of the ODU 108 and sODU 111 may be within the base station 106 or other enclosure and still maintain the wireless data path to the customer sites 112.

IF Redundancy Card

Figure 4:
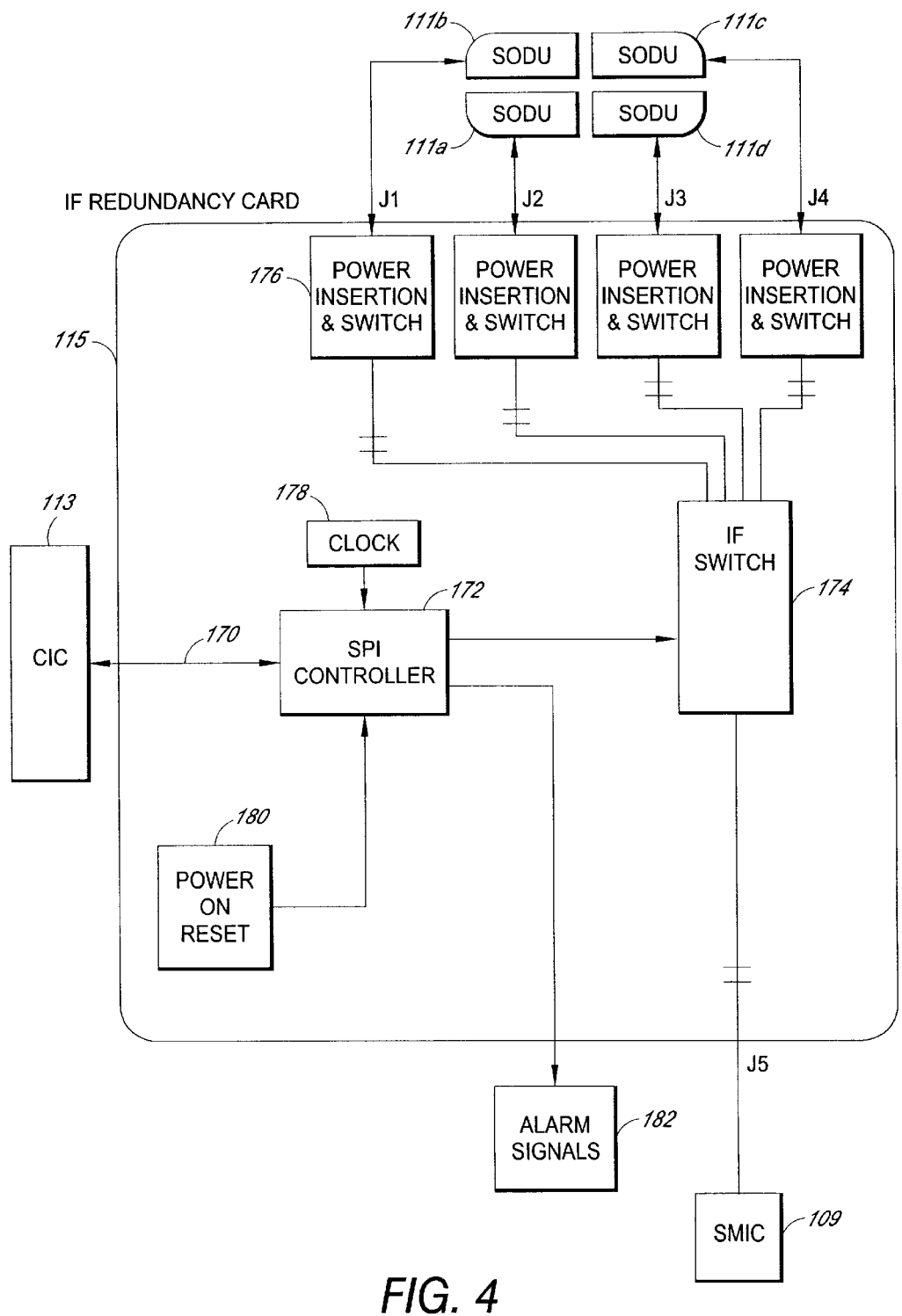
FIG. 4 is a block diagram of an embodiment of an IF Redundancy Card module from the Base Station illustrated in FIG. 2.

Now referring to FIG. 4, a more detailed block diagram of the IF redundancy card 115 from FIG. 2 is provided. As illustrated, one embodiment of the IF redundancy card 115 includes a Serial Peripheral Interface (SPI) controller 172, an Intermediate Frequency (IF) switch 174, a plurality of power insertion and switch modules 176, and a clock 178. In one embodiment, these components are incorporated into a single card allowing the IF redundancy card 115 to be rack mounted. This arrangement further permits the IF redundancy card 115 to be hot swappable, which eases servicing and promotes growth. One in the art will recognize that these components may alternatively be arranged between multiple boards in multiple locations.

The SPI controller 172 receives control messages from the controller interface card (CIC) 113 across a cable 170 or other electrical connection well known in the art. Based on these control messages, the SPI controller 172 activates the IF switch 174 to connect the sMIC 109 to one of the plurality of power insertion and switch modules 176. The power insertion and switch module 176 allows the sODU 111(a)–(d) to receive power even when it is not connected to the standby sMIC 109.

Each power insertion and switch module 176 is further connected through a port, J1, J2, J3, and J4 to one of the plurality of sODU 111. The SPI controller 172 selects which power insertion and switch module 176 is connected to the IF switch 174 depending on the correlation between the sectors covered by the ODUs 108(a–n) and the sectors covered by each sODU 111(a–n). For example, as illustrated in FIGS. 2 and 3, if ODU 108(a) failed, the CIC 113 would instruct the SPI controller 172 to select the power insertion and switch module 176 that was connected to the J2 port wherein activation of sODU 111(a) would occur. In this example, the sODU 111(a) and the ODU 108(a) transmit and receive in the same sector. In one embodiment, this correlation information is stored in the CIC 113.

Controller Interface Card

Figure 5:
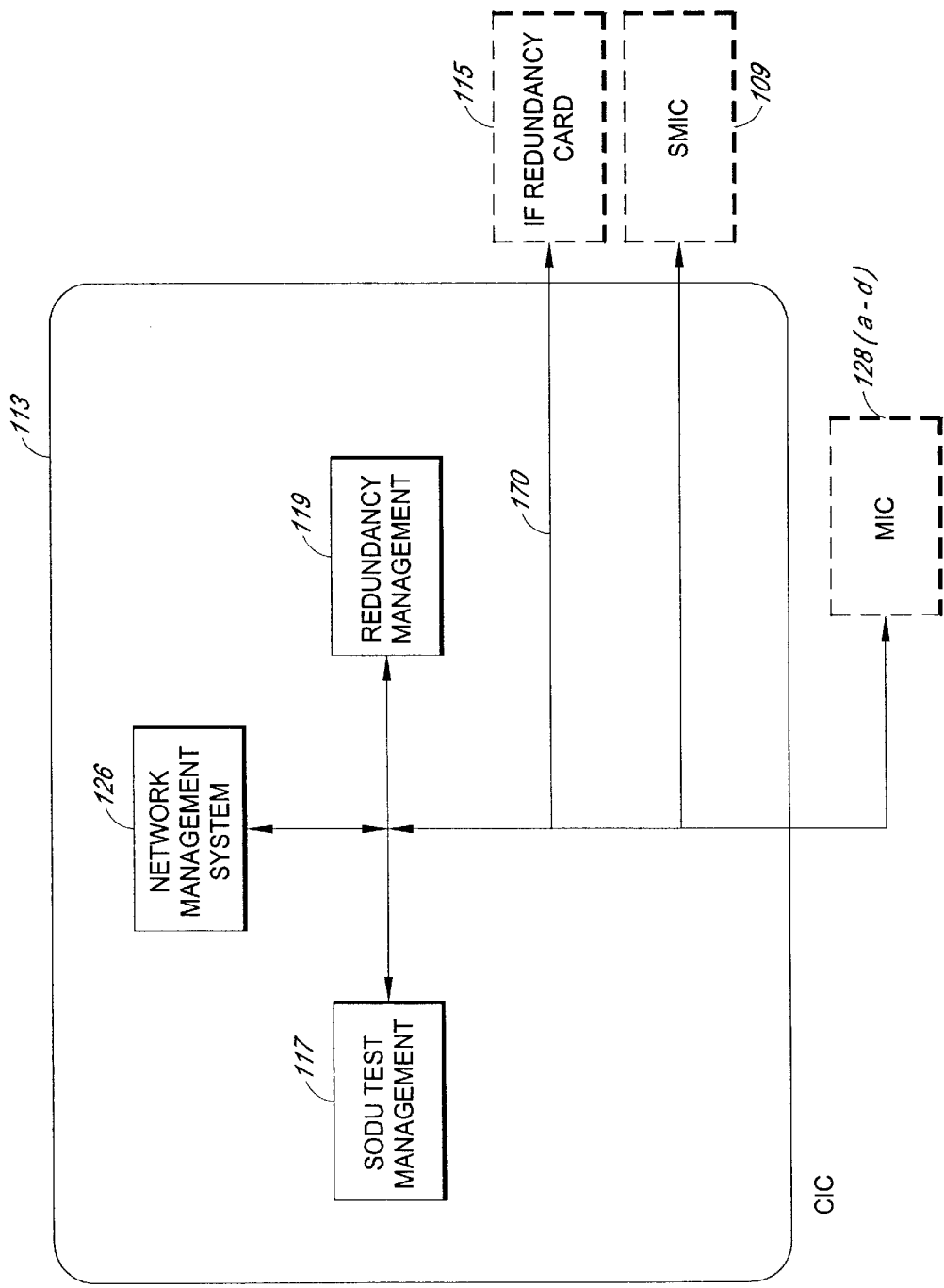
FIG. 5 is a block diagram of an embodiment of a Controller Interface Card (CIC) module from the Base Station illustrated in FIG. 2.

Now referring to FIG. 5, a more detailed block diagram of the controller interface card (CIC) 113 from FIG. 2 is provided. As illustrated, the CIC 113 includes an sODU test management module 117, a redundancy management module 119, and a Network Management System (NMS) 126. In one embodiment, the CIC communicates with the redundancy system 104 by way of the cable 170 and a cable 171. Furthermore, the CIC 113 is also in communication with each MIC 128 to receive the fault messages from the fault bus processor 121 over the fault bus. In one embodiment, the redundancy management module 119 monitors the status of all the MICs 128. The fault management module 117 evaluates the information received from the MICs 128 and takes the appropriate corrective action. For example, the fault management module 117 switches out a faulty MIC/ODU 128, 108 pair and substitutes a standby sMIC/sODU 109, 111 pair instead. A multitude of alternate data paths could be used by the CIC 113 to provide connections with the redundancy system 104 and the rest of the base station 104.

The sODU test management module 117 provides the instructions for the periodic testing of the plurality of sODU 111. This testing ensures that each sODU 111(a–d) can be properly connected through the IF redundancy card 115 to the sMIC 109 in case a switchover occurs. The sODU test management module 117 process will be discussed in detail below.

Still referring to FIG. 5, the redundancy management module 119 provides the switchover signal to the IF redundancy card 115 and actively monitors the call control information for the MIC/ODU 128, 108 pairs within the base station 104. This allows the redundancy management module 119 to provide steady state call control information to the sMIC/sODU 109, 111 when the redundancy system 104 is activated. Thus, any disruption to the data stream of a customer during a switchover is reduced. The redundancy management module 119 will be further discussed below in the context of fault correlation (described below), wireless communication system 100 switchover (described below), wireless communication system 100 switchback (described below), and call control synchronization (described below).

The Network Management System (NMS) 126 provides system level instructions for the sODU test management module 117 and the redundancy management module 119 while also furnishing an interface between the wireless communication system 100 and an operator (not shown). The commands by the NMS 126 are described below.

Fault Messages

1. Failure Scenarios

One of the fault bus processors 121, as shown in FIG. 2, is located in each MIC 128. Each fault bus processor 121 reports faults, native to its MIC 128, to the redundancy management module 119 in the CIC 113 for further analysis. Depending on the nature of the reported fault, the wireless communication system 100 may switchover to one of the sMIC/sODU 109, 111 pairs or perform fault correlation. For example, in determining the nature of the fault, the ability of the wireless communication system 100 to continue normal operation and the severity of the failure are examined.

In one embodiment, each fault message is classified as either a critical task failure or an important task failure. This classification may be, for example, based on the criticality of the fault message to the wireless communication system 100. If the fault message indicates a critical task failure has occurred, the wireless communication system 100 performs a switchover as described below. If the fault message reports an important task failure has occurred, the wireless communication system 100 would not switchover to one of the sMIC/sODU 109, 111 pairs. In cases where the determination as to the criticality of the fault message is unclear, for example when a clock failure message or no response to polling failure messages is received, fault correlation may be performed to determine whether the fault message is indicative of a critical or important task failure. Fault correlation will be described below.

2. Network Management System Commands

As shown in FIGS. 4 and 5, the Network Management System (NMS) 126 stores the correlation data between ports J1, J2, J3, and J4 and sODU 111(a–d). For the controller interface card (CIC) 113 to properly configure the IF redundancy card 115 for a switchover, the CIC 113 must know which sODU 111(a–d) is connected to which port, J1, J2, J3, or J4, on the IF redundancy card 115. Additionally, the CIC 113 will know which sODU 111(a–d) has a sectorization scheme similar to each ODU 108(a–d). With this data, the CIC 113 selects the sODU 111 with a sectorization scheme similar to the sectorization scheme of the failed ODU 108 for the switchover and commands the SPI controller 172 to affect a switchover to that sODU 111. In one embodiment, the operator does the correlation mentioned above, i.e., provisioning.

In one embodiment, the redundancy system 107 comprise at least two sMIC 109(a–b), each with its own plurality of sODU 111(a–d) to provide additional sMIC/sODU 109(b), 111(a–d) pairs if multiple switchovers should occur before the NMS operator is able to repair the failed MIC/ODU 128, 108 pair. Continuing with this embodiment, the CIC 113 will store the connection information for both sMIC 109(a–b) and ports J9–J10 along with the connection data for each plurality of sODU 111(a–d) and ports, J1–J8. In this embodiment, both sMIC 109(a–b) are connected in parallel with each plurality of sODU 111(a–d). Thus, the controller interface card (CIC) 113 may select from either plurality of sODU 111(a–d) along with one sMIC 109 to replace a failed MIC/ODU 128, 108 pair. In another embodiment, the at least two sMIC 109(a–b) share one plurality of sODU 111(a–d). It should be recognized that numerous combinations of sMIC 109 and sODU 111 are possible, all of which are within the spirit of the invention.

Failure Recovery

1. Initialization of sMIC

The sMIC 109 boots normally until the point where it would connect to the sODU 111(a–d). Once booted, the sMIC 109 is in a "hot standby" mode until called upon by a switchover command from the redundancy management module 119. Unlike the MIC 128, which connects to the ODU 108 after initialization, the sMIC 109 only becomes active if called upon by the redundancy management module 119 in the controller interface card (CIC) 113. In one embodiment, the sMIC 109 connects to one of the plurality of sODU 111, selected as a default unit, when in the "hot standby mode." When called upon by the redundancy management module 119, the sMIC 109 will then switch from the default unit to the sODU 111(a–d) which correlates with the ODU 108(a–d) from the failed MIC/ODU 128, 108 pair.

2. sODU Test Management

Figure 6:
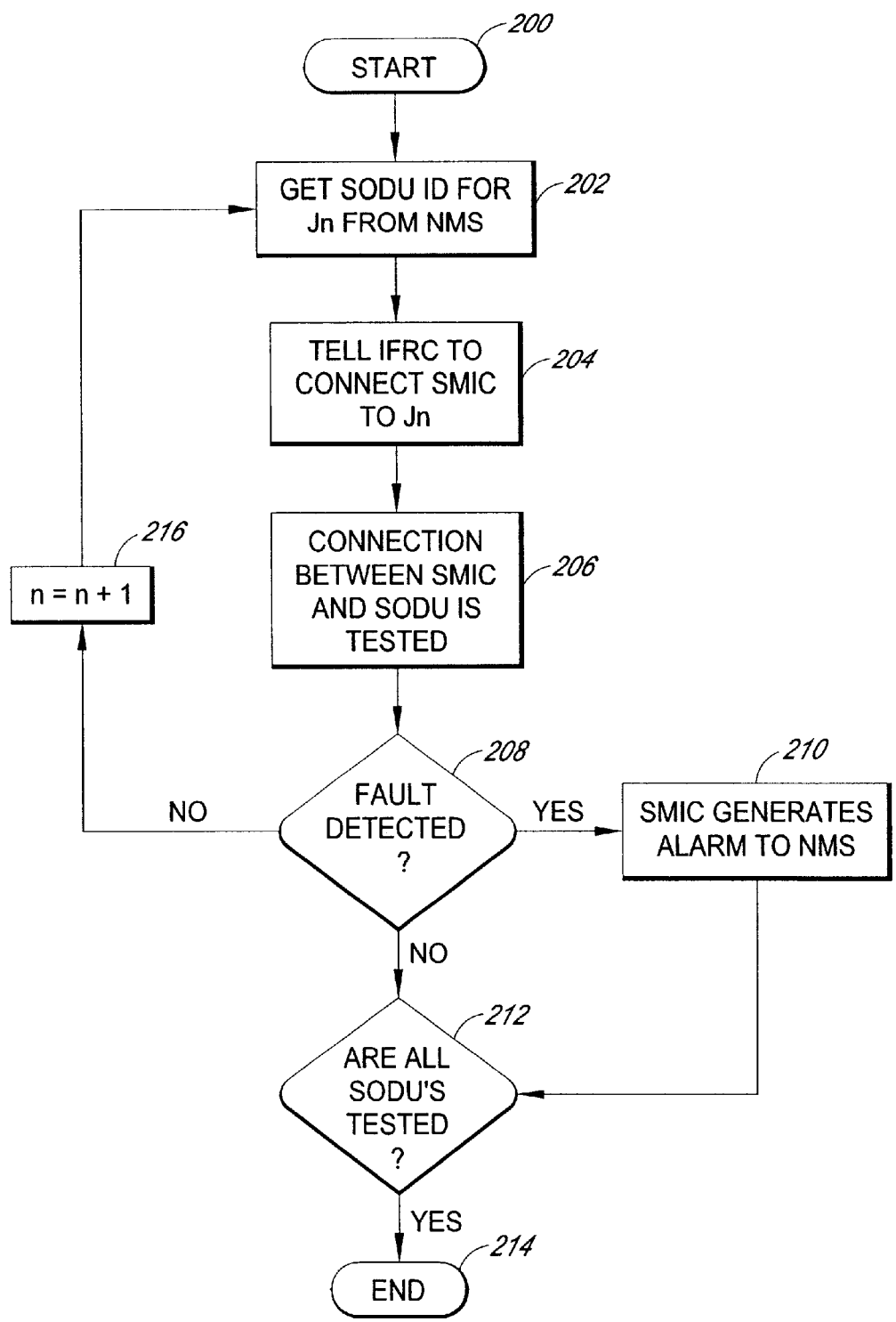
FIG. 6 is a flow diagram of one embodiment of a standby outdoor unit (sODU) test management process undertaken by the CIC.

Now referring to FIG. 6, a flow diagram of the sODU test management process, which is performed by the sODU test management module 117, is provided. Flow begins at a start state 200. Next, at a state 202, the controller interface card (CIC) 113 retrieves a mapping of the ODUIds to port numbers, J1–J4 via the Network Management System (NMS) 126. Continuing to a state 204, the CIC 113 selects a port to be tested and sends an SPI command, via cable 170, to the IF redundancy card 115 instructing it to connect the sMIC 109 to the selected port, for example, J1. Next, at a state 206, the CIC 113 sends a command to the sMIC 109 instructing it to perform a test connection with the sODU 111(a–d) corresponding to port J1.

The sODU test management module 117 then moves to a decision state 208 to determine if a fault was detected during the test performed at state 206. If a fault was detected, the sODU test management module 117 continues to a state 210 where an alarm is generated by the sMIC 109 and sent to the NMS 126. After the the alarm has been sent, the sODU test management module 117 moves to a decision state 212 to determine whether all of the sODU 111(a–d) from the plurality of sODU 111 have been tested. If all of the sODU 111 from the plurality of sODU 111(a–d) have been tested, the sODU test management module 117 moves to an end state 214 where it terminates.

Referring again to decision state 208, if a fault was not detected during the testing of the sODU 111(a–d), the sODU test management module 117 proceeds to decision state 212 as discussed above.

Referring again to decision state 212, if one sODU 111 from the plurality of sODU 111(a–d) has not been tested, the sODU test management module 117 flows to a state 216 where the next port is designated to be n=n+1. The test management module 117 then continues to state 202 as discussed above to perform testing of the next sODU 111.

Someone skilled in the art will appreciate that the interval for the entire testing process, or portions thereof, may be, for example, once a second, once a minute, once a day, or any other such interval that is chosen by the NMS 126 operator. In one embodiment, the sODU test management module 117 waits an indeterminate amount of time between each test of the plurality of sODU 111.

3. Redundancy Management

As discussed above, the redundancy management module 119, located in the controller interface card (CIC) 113, evaluates messages from the fault bus processor 121 to determine whether a switchover should be initiated. In response to failure messages, the CIC 113 activates the redundancy system 107 based on the contents of the message received from the fault bus processor 121 located in the initiating MIC 128.

In one embodiment, each fault message received by the redundancy management module 119 is classified as either a critical task failure or an important task failure. This classification may be, for example, based on the criticality of the fault message to the wireless communication system 100. If the fault message indicates a critical task failure has occurred, the wireless communication system 100 performs a switchover as described below. If the fault message reports an important task failure has occurred, the wireless communication system 100 would not switchover to one of the sMIC/sODU 109, 111 pairs. In cases where the determination as to the criticality of the fault message is unclear, for example when a clock failure message or no response to polling failure messages is received, fault correlation may be performed to determine whether the fault message is indicative of a critical or important task failure. Where a clock failure message or a no response to polling failure message is received, the failure message may not be indicative of a failure originating in a single MIC/ODU 128, 108 pair but rather originating at the wireless communication system 100 level.

Figure 7:
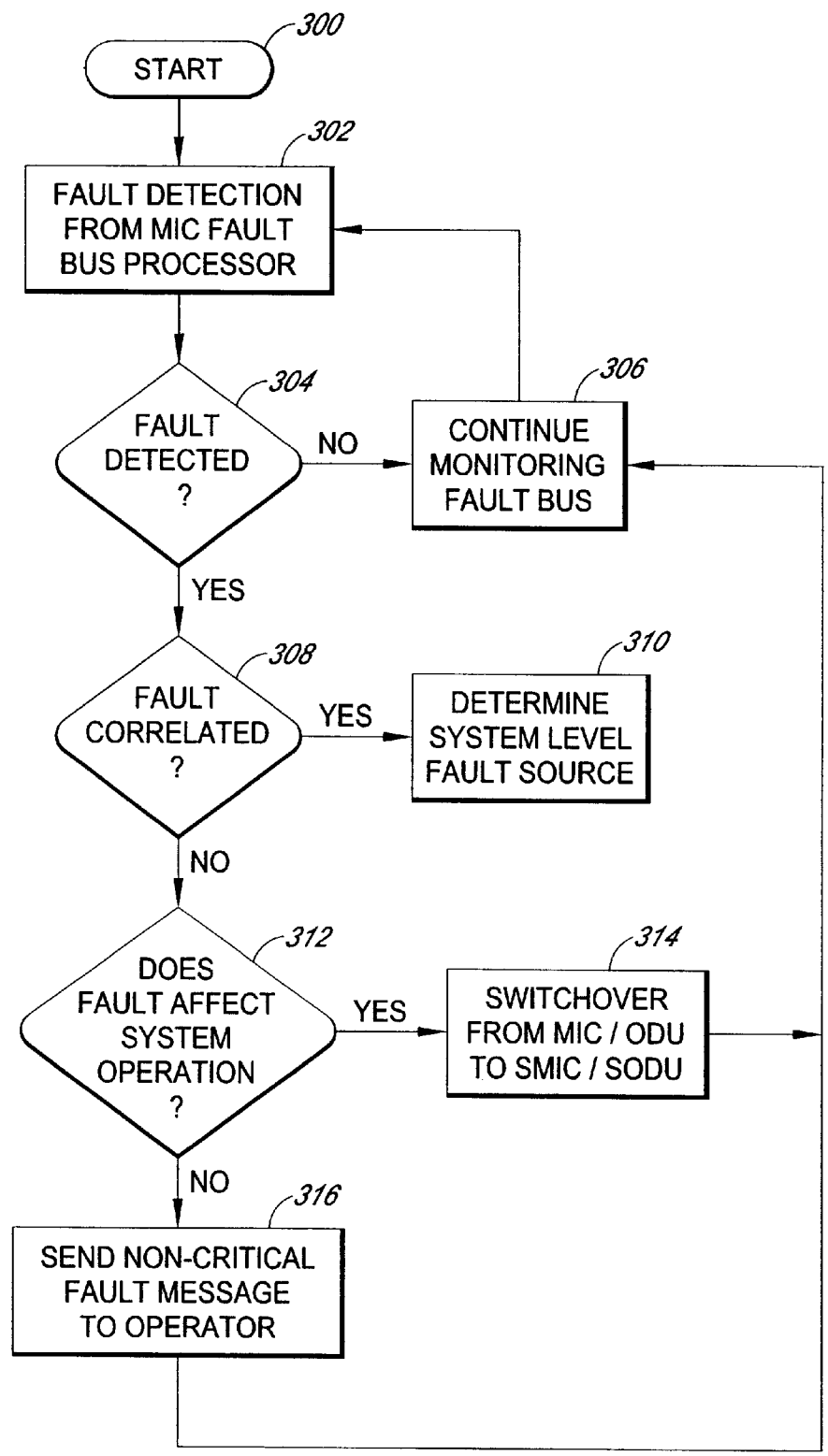
FIG. 7 is a flow diagram of one embodiment of a redundancy management process undertaken by the CIC.

Now referring to FIG. 7, a flow diagram of the redundancy management process, which is performed by the redundancy management module 119, is provided. Flow begins at a start state 300. Next, at a state 302, the controller interface card (CIC) 113 continually monitors the fault bus processor 121 on each MIC 128 for fault messages. The communications processor 132 on each MIC 128 locally monitors the quality of the received signal.

The redundancy management module 119 then moves to a decision state 304 to determine if a fault message was detected. If a fault message was not detected at decision state 304, the process continues to a state 306 where the monitoring of the fault bus processor 121 continues. Next, from state 306, the redundancy management module 119 continues to the state 302 as discussed above.

Referring again to decision state 304, if a fault message is detected from the fault bus processor 121, the redundancy management module 119 moves to a decision state 308 to determine if the fault message correlates with more than one MIC 128. The redundancy management module 119 provides a centralized view of all events. This prevents a local view at one MIC 128 from misleading the redundancy management module 119 and causing an unnecessary switchover. Thus, each MIC 128 reports its own view of the event and the CIC 113 makes the final decision using fault correlation. In one embodiment, fault correlation is performed when the fault message is either a clock failure message or a no response to polling message. Both of these failure scenarios are discussed in detail below. If the fault message has been reported by more than one MIC 128, the redundancy management module 119 flows to a state 310 to alert the operator of the wireless communication system 100 level failure.

Referring again to decision state 308, if the fault message has been reported by only one MIC 128, the redundancy management module 119 continues to a decision state 312 to determine whether the fault effects operation of the wireless communication system 100. An example of a system level fault that would affect a switchover is a critical task failure as opposed to an important task failure. If it is a critical task failure, the redundancy management module 119 moves to a state 314 where a switchover from the fault originating MIC/ODU 128, 108 pair to the corresponding sMIC/sODU 109, 111 is accomplished. The specifics of the switchover process will be discussed in detail below. After the switchover at state 314 occurs, flow proceeds to state 306 as discussed above.

Referring again to decision state 312, if the fault message is not indicative of a critical task failure, the redundancy management module 119 continues to a state 316 where a non-critical fault message is sent to the Network Management System (NMS) 126 operator. Flow then proceeds to state 306 as discussed above where the redundancy management module 119 continues its monitoring of faults from the MIC 128.

a. Fault Correlation

As mentioned above, prior to determining whether a fault message is indicative of a critical or important task failure, the redundancy management module 119 may perform fault correlation. Two examples of fault messages where fault correlation is performed are a clock failure message and a no response to polling message. Both of which will now be described in detail.

i. Clock Failure Message

A clock failure message received by the redundancy management module 119 is either indicative of a problem with the clock source or possibly with a particular MIC 128 use of the clock. Since the clock failure may occur at a system level, a premature switchover from the MIC/ODU 128, 108 to the sMIC/sODU 109, 111 would not cure the fault. Thus, the redundancy management module 119 performs fault correlation to determine the cause of the clock fault as outlined below.

Figure 8:
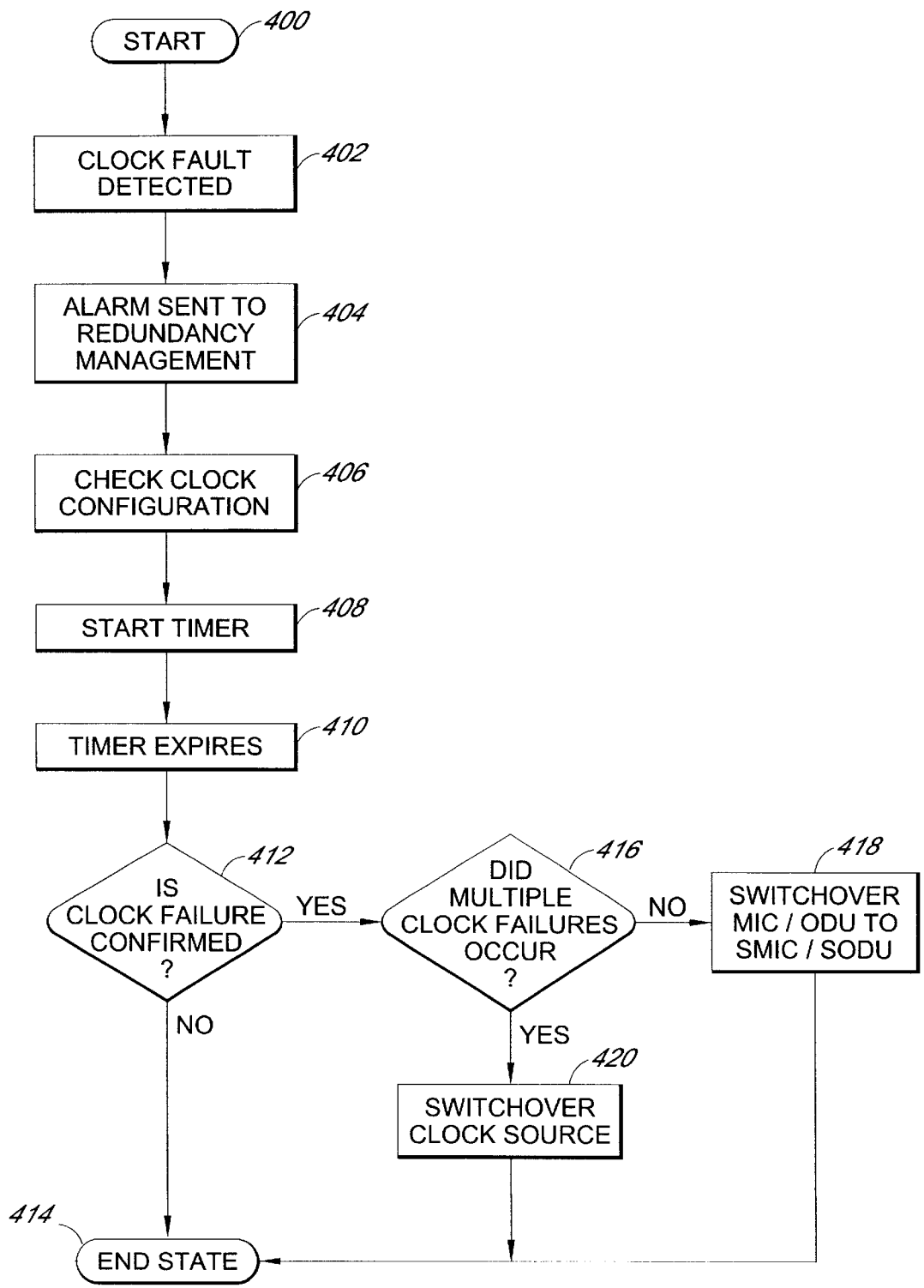
FIG. 8 is a flow diagram of one embodiment of the redundancy management process applied to a clock failure message.

Now referring to FIG. 8, a clock failure flow diagram of the fault correlation process in state 308 of FIG. 7 which is performed by the redundancy management module 119 is provided. Flow begins at a start state 400. Next, at a state 402, the controller interface card (CIC) 113 receives a fault message from the fault bus processor 121 on one of the plurality of MIC 128. This message indicates the wireless communication system 100 has experienced a clock failure and thus, the data being communicated by the responsible MIC/ODU 128, 108 pair may need to be switched over to the corresponding sMIC/sODU 109, 111.

Flow proceeds to a state 404 where an alarm is sent to the redundancy management module 119 to create a record of the fault. The process continues to a state 406 where the clock configuration is checked by initiating a standby mode for the clock source. Next, at a state 410, the redundancy management module 119 starts a timer along with the clock source in parallel. The process then moves to a state 410 where the timer expires. The redundancy management module 119 then moves to a decision state 412 to determine whether the clock fault reoccurred with respect to the timer. If the fault did not reoccur at decision state 412, the process continues to an end state 414 where the process terminates.

Referring again to decision state 412, if the clock fault is confirmed, the redundancy management module 119 continues to a decision state 416 to determine whether multiple clock faults from different MIC/ODU 128, 108 pairs have occurred. If only a single clock fault was detected, the process continues to a state 418 where a switchover from the clock fault originating MIC/ODU 128, 108 pair to the corresponding sMIC/sODU 109, 111 pair is performed. A switchover is performed since the likely cause of the clock fault is handling of the clock by the MIC 128. The switchover process at state 418 will be discussed in detail below. The redundancy management module 119 then proceeds to the end state 414.

Referring again to decision state 416, if multiple clock faults were detected, the redundancy management module 119 moves to a state 420 where the source of the clock is switched. The redundancy management module 119 process then continues to end state 414 where the process terminates.

ii. No Response to Polling Message

A no response to polling error message may be indicative of a system level problem, for example, electrical removal of the MIC 128 from the base station 104. In this case, the redundancy management module 119 will perform a switchover from the failed MIC/ODU 128, 108 pair to the sMIC/sODU 109, 111. However, if the problem originates from the failure of the SPI controller 172 on the IF redundancy card 115, for example an ST7 controller, operation of the wireless communication system 100 will not be impacted. A switchover from the accused MIC/ODU 128, 108 pair to the sMIC/sODU 109, 111 pair will not be performed. Thus, the redundancy management module 119 performs fault correlation to determine the cause of the no response to polling fault before a switchover occurs as outlined below.

Figure 9:
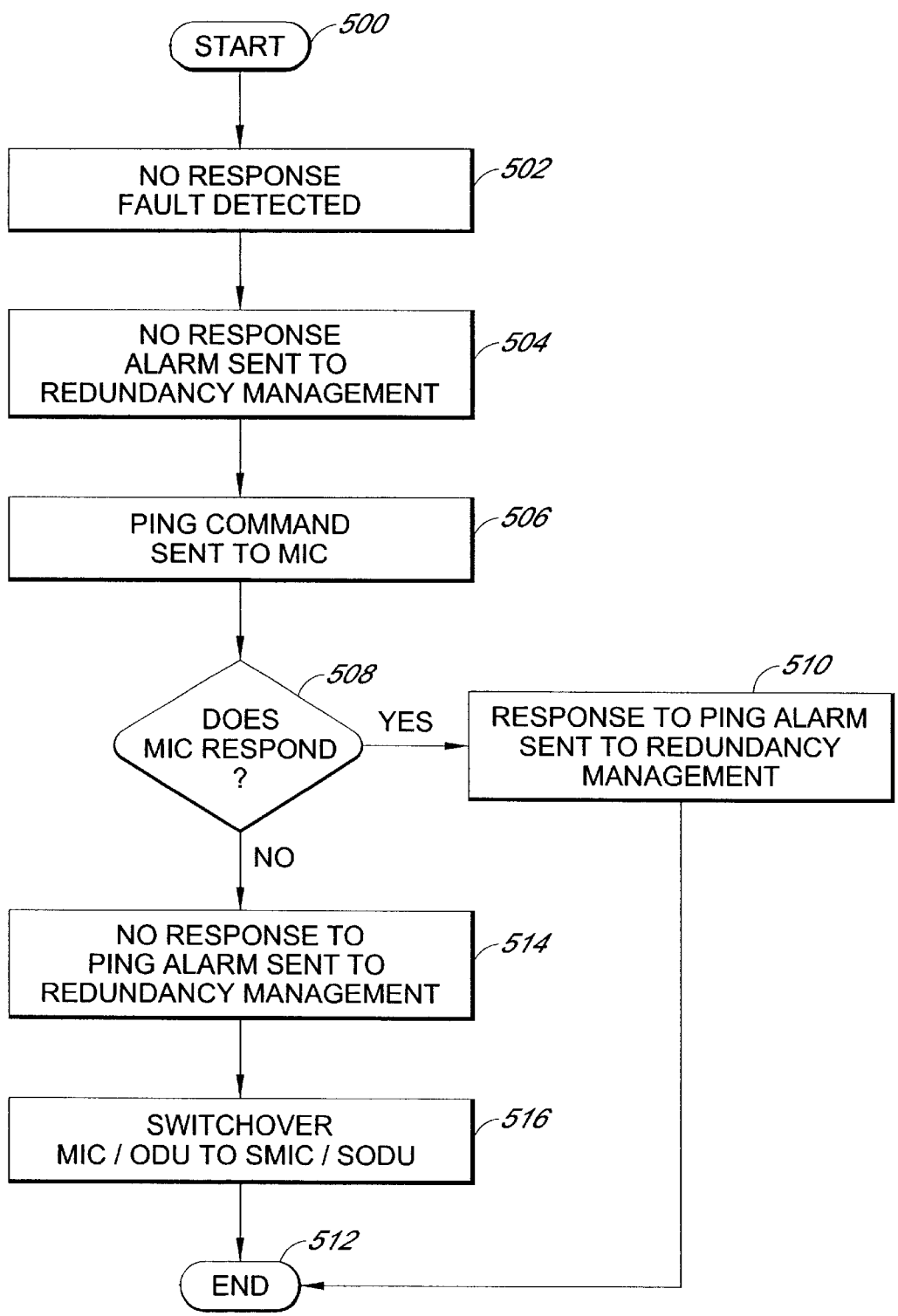
FIG. 9 is a flow diagram of one embodiment of the redundancy management process applied to a no polling response failure message.

Now referring to FIG. 9, a no response to polling failure flow diagram of the fault correlation process in state 308 of FIG. 7 which is performed by the redundancy management module 119 is provided. Flow begins at a start state 500. Next, at a state 502, the controller interface card (CIC) 113 receives a fault message from the fault bus processor 121 on one of the plurality of MIC 128. This message indicates the wireless communication system 100 has experienced a no response to polling fault and thus, the customer data being communicated by the responsible MIC/ODU 128, 108 pair may need to be switched over to the sMIC/sODU 109, 111 pair.

Flow proceeds to a state 504 where an alarm is sent to the redundancy management module 119 to create a record of the fault. The process continues to a state 506 where a signal, for example a "ping," is sent from the CIC 113 to the unresponsive MIC 128 via an alternate connection, such as, a control bus (not shown). Next, at a decision state 508, the redundancy management module 119 determines if the MIC 128 that received the 'ping" responds. If the MIC 128 responds to the CIC 113, another alarm is sent to the redundancy management module 119 to create a record of the response by the MIC 128. This can be caused by, for example, a communication error between the CIC 113 and the MIC 128 along the fault bus. Flow then proceeds to an end state 512 where the redundancy management module 119 process terminates.

Referring again to decision state 508, if the MIC 128 does not respond to the "ping" sent by the CIC 113, the process continues to a state 514 where another alarm is sent to the redundancy management module 119 to create a record that there was no response by the MIC 128. At a next state 516, a switchover from the fault originating MIC/ODU 128, 108 pair to the corresponding sMIC/sODU 109, 111 pair is performed. The switchover process at state 516 will be discussed in detail below. The redundancy management module 119 fault correlation process then proceeds to the end state 512 and terminates.

4. Switchover from MIC/ODU to sMIC/sODU

Figure 10:
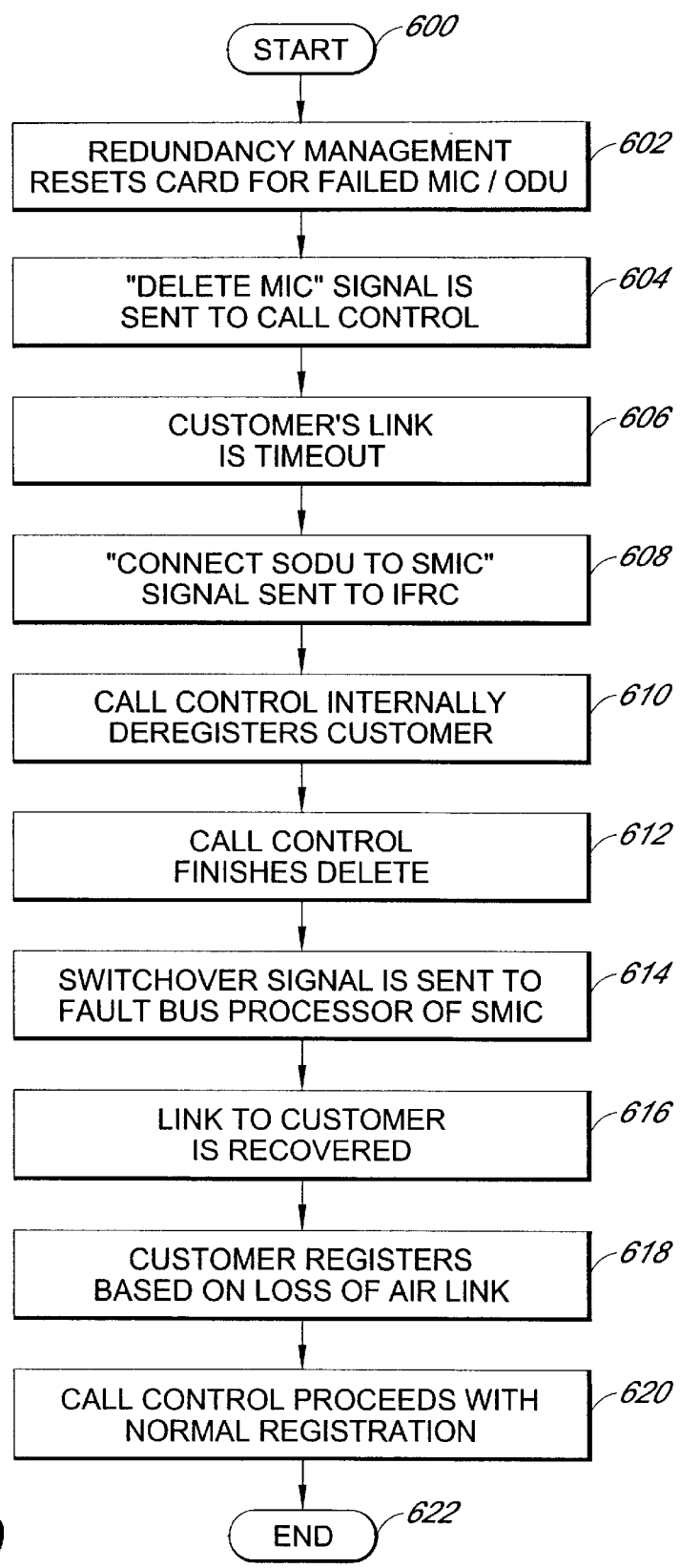
FIG. 10 is a flow diagram of one embodiment of a switchover process from a failed MIC and outdoor unit (ODU) pair to a standby MIC (sMIC) and standby outdoor unit (sODU).

Now referring to FIG. 10, a flow diagram of the switchover process from state 314 from FIG. 7, state 418 from FIG. 8, and state 516 from FIG. 9 is provided. Flow begins at a start state 600. Next, at a state 602, the redundancy management module 119 resets the fault bus processor 121 of the failed MIC 128. Flow proceeds to a state 604 where a "delete MIC" signal is sent via call control. Call control is an application layer protocol that is used to exchange information regarding, for example, system and service configuration and fault management between the system cards. The switchover process continues to a state 606 where the link from the customer premises equipment 110 that is assigned to the failed MIC/ODU 128, 108 pair is timed out. The process continues to a state 608 where a "connect sODU to sMIC" signal is sent to the IF redundancy card 115. Since each sODU 111 is configured to functionally replace one of the plurality of ODU 108, the selection of the sODU 111 will be determined based on which sODU 111 matches the sectorization scheme of the failed MIC/ODU 128, 108 pair. Thus the sMIC 109 connects with the selected sODU 111 to replace both the failed MIC 128 and its ODU 108 or the failed ODU 108 and its MIC 128. Next, at a state 610, call control internally deregisters the customer corresponding to the failed MIC 128. The call control registration/deregistration process will be discussed in detail below.

Flow then continues to a state 612 where call control sends a signal back to the redundancy management module 119 that the "delete MIC" command of state 604 is completed. The switchover process then moves to a state 614 where the signal to "switchover" is sent to the fault bus processor 121 of the sMIC 109. In one embodiment, this signal is also sent to additional components in the base station 106 to prevent interface issues between the additional components and the newly activated components. At a next state 616, the link to the CPE 110 is recovered through the corresponding sMIC/sODU 109, 111 pair. Flow continues to a state 618 where the CPE 110 automatically reregisters based on the temporary loss of the air link to the MIC/ODU 128, 108. The switchover process proceeds to a state 620 where the call control reregisters the CPE 110 via the now active sMIC/sODU 109, 111. The switchover process then terminates at an end state 622.

5. Switchback to MIC/ODU from sMIC/sODU

When a switchover does occurs as described above, the wireless communication system 100 is no longer redundant and the operator of the Network Management Process (NMS) 126 must bring the wireless communication system 100 back into a redundant state. This is accomplished by switching back from the now active sMIC/sODU 109, 111 pair to the repaired MIC/ODU 128, 108 pair as described below.

Figure 11:
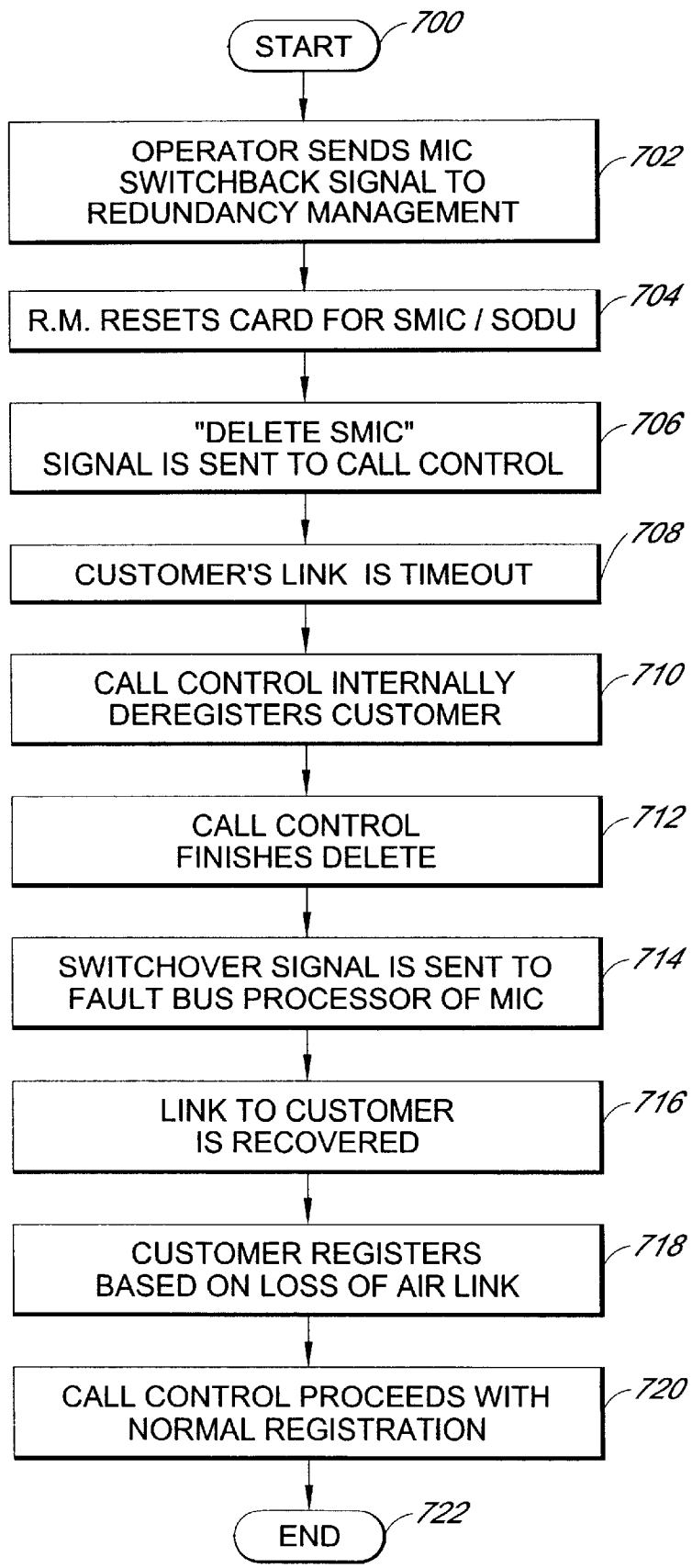
FIG. 11 is a flow diagram of one embodiment of a switchback process from the sMIC and sODU to a repaired MIC and ODU.

Now referring to FIG. 11, a flow diagram of the switchback process is provided. Flow begins at a start state 700. Flow proceeds to a state 702 where the NMS 126 operator initiates the switchback to the MIC/ODU 128, 108 pair by sending a signal to the redundancy management module 119. Next, at a state 704, the redundancy management module 119 resets the fault bus processor 121 of the sMIC 109. Flow proceeds to a state 706 where a "delete sMIC" signal is sent via call control. The switchback process continues to a state 708 where the link from the customer premises equipment 110 that is assigned to the active sMIC/sODU 109, 111 pair is timed out. Next, at a state 710, call control internally deregisters the CPE 110 corresponding to the sMIC 109/sODU 111 pair. The call control registration/deregistration process will be discussed in detail below.

Flow then continues to a state 712 where call control sends a signal back to the redundancy management module 119 that the "delete sMIC" command of state 706 is completed. The switchback process then moves to a state 714 where the signal to "switchback" is sent to the fault bus processor 121 of the repaired MIC 128. In one embodiment, this signal is also sent to additional components in the base station 106 to prevent interface issues between the additional components and the newly activated components. At a next state 716, the link to the CPE 110 is recovered through the repaired MIC/ODU 128, 108 pair. Flow continues to a state 718 where the CPE 110 automatically reregisters based on the temporary loss of the air link to the deactivated sMIC/sODU 109, 111. In one embodiment, call control sends a signal to the CPE 110 that identifies the new MIC/ODU 128, 108 pair. The switchback process proceeds to a state 720 where the call control reregisters the CPE 110 via the repaired MIC/ODU 128, 108 pair. The switchback process then terminates at an end state 722.

6. Call Control Synchronization

The switchover/switchback processes interrupt the signal between the customer premises equipment 110 and the Network 114. In one embodiment, portions of the connection call control data, which is specific to each CPE 110, is stored partially in both the MIC 128 and CIC 113. In one embodiment, the low-level portion of the call control data is stored on the MIC 128 and thus is lost when the MIC 128 fails. However, this low-level data is easily reconstructed from scratch on the sMIC 109 should a switchover occur. Since only low level data is stored on the failed MIC 128, steady state synchronization between the MIC 128 and the sMIC 109 is not necessary.

The high level data is stored on the CIC 113 which is connected to both the MIC 128 and sMIC 109 as discussed above. When a switchover or switchback occurs, the high level data on the CIC 113 is not lost but the connection is partially completed since the active MIC 128 has failed or the active sMIC 109 has been deactivated. For the CPE 110 to reconnect, the high level data is torn down and then recreated and tested when the CPE 110 reregisters during the call control synchronization process described below.

Figure 12:
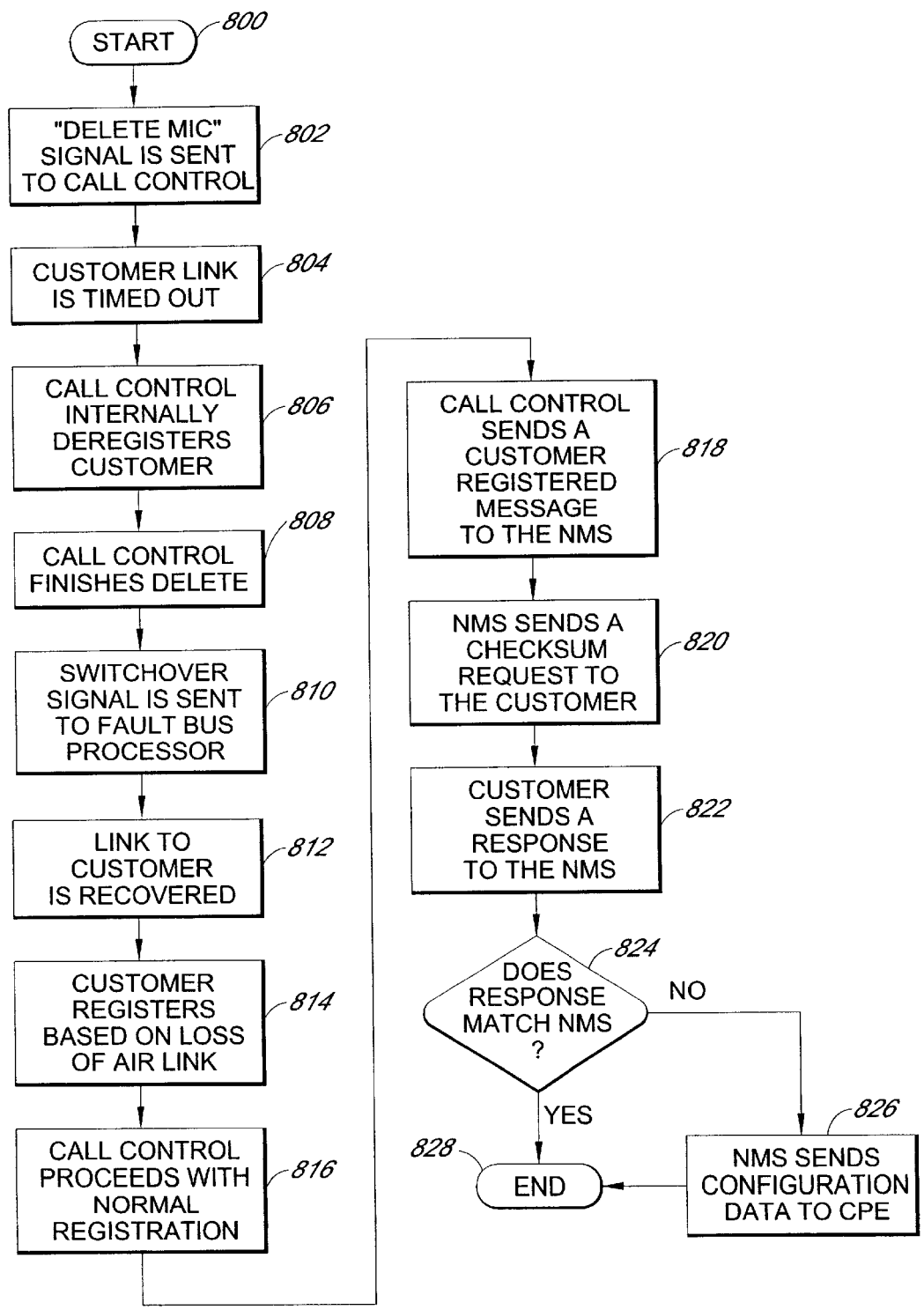
FIG. 12 is a block diagram of a call control process used during the switchover process of FIG. 10 that maintains service with a customer.

Now referring to FIG. 12, a flow diagram of the call control synchronization process is provided. Flow begins at a start state 800. Flow proceeds to a state 802 where a "delete MIC" signal is sent via call control. In one embodiment, this signal is also sent to additional components in the base station 106. The process continues to a state 804 where the link from the CPE 110 that is assigned to the failed MIC/ODU 128, 108 pair is timed out. Next, at a state 806, call control internally deregisters the CPE 110 corresponding to the failed MIC 128.

Flow then continues to a state 808 where call control sends a signal back to the redundancy management module 119 that the "delete MIC" command of state 802 is completed. The call control synchronization process then moves to a state 810 where the signal to "switchover" is sent to the fault bus processor 121 of the sMIC 109. At a next state 812, the link to the CPE 110 is recovered through the activated sMIC/sODU 109, 111 pair. Flow continues to a state 814 where the CPE 110 automatically reregisters based on the temporary loss of the air link to the failed MIC/ODU 128, 108 pair. In one embodiment, the CPE 110 is notified by the NMS 126 that the MIC/ODU 128, 108 has failed. The call control synchronization process proceeds to a state 816 where the call control reregisters the CPE 110 via the active sMIC/sODU 109, 111.

Next, at a state 818, call control sends a "CustomerRegistered" message to the NMS 126 in the base station 104. Flow then continues to a state 820 where the NMS 126 responds with a message, for example, a "checksum request," to the CPE 110. The "checksum request" is used to verify that the call configuration of the CPE 110 is identical to the configuration expected by the NMS 126. The call control synchronization process then moves to a state 822 where the CPE 110 sends a response to the "checksum request" that is calculated over its entire configuration to the NMS 126.

Flow proceeds to a decision state 824 to determine whether the response from the CPE 110 matches what the NMS 126 expected. If the CPE 110 response matches the NMS 126, flow proceeds to an end state 828. Now referring back to decision state 824, if the response from the CPE 110 does not match with what the NMS 126 expected, the process flow moves to a state 826 where the NMS 126 sends the configuration data to the CPE 110. Flow then proceeds to the end state 828.

Other Embodiments

Accordingly, it is to be understood that the invention is not to be limited by the specific illustrated embodiment, but only by the scope of the appended claims.

What is claimed is:

1. A wireless communication system base station comprising both primary components and standby components for transmitting and receiving data in a plurality of sectors in a coverage area, the system comprising:
   a plurality of primary modem interface cards configured to modulate and demodulate data;
   a plurality of primary outdoor units, each coupled to one of the primary modem interface cards and configured to transmit and receive modulated data between one of the plurality of primary modem interface cards and one of a plurality of sectors in a coverage area;
   a first standby modem interface card configured to modulate and demodulate data and to replace a failed one of the plurality of primary modem interface cards;

a plurality of standby outdoor units, each configured to transmit and receive modulated data between the first standby modem interface card and one of the plurality of sectors in the coverage area;

a controller interface card configured to select one of the plurality of standby outdoor units associated with a failed one of the plurality of primary outdoor units; and a redundancy card configured to route modulated data between the first standby modem interface card and the selected one of the plurality of standby outdoor units.

2. The system of claim 1, wherein the redundancy card comprises a processor coupled to a switch matrix for routing data between the first standby modem interface card and one of the plurality of standby outdoor units.

3. The system of claim 1, wherein each of the plurality of primary outdoor units comprises an upconverter and an antenna for transmitting and receiving modulated data.

4. The system of claim 1, wherein each of the plurality of primary modem interface cards comprises a modem and a communications processor for modulating and demodulating data.

5. The system of claim 1, further comprising a backhaul interface configured to route data between a backhaul and both the plurality of primary modem interface cards and the first standby modem interface card.

6. The system of claim 1, further comprising a test management module configured to periodically test the connections between the redundancy card and the plurality of standby outdoor units.

7. The system of claim 1, wherein each of the plurality of primary modem interface cards includes a fault bus processor configured to monitor the operation of one of the plurality of primary modem interface cards and its associated one of the plurality of primary outdoor units.

8. The system of claim 7, further comprising a redundancy management module configured to determine whether the first standby modem interface card shall replace one of the primary modem interface cards based on a received fault message from the fault bus processor.

9. The system of claim 1, wherein the plurality of primary modem interface cards includes four primary modem interface cards and the plurality of primary outdoor units includes four primary outdoor units.

10. The system of claim 1, wherein the plurality of standby outdoor units includes four standby outdoor units.

11. The system of claim 1, wherein the plurality of primary modem interface cards includes eight primary modem interface cards and the plurality of standby outdoor units includes eight standby outdoor units.

12. The system of claim 11, further comprising a second standby modem interface card configured to modulate and demodulate data and to replace more than one of the plurality of primary modem interface cards.

13. The system of claim 1, further comprising a network management system module configured to provide an interface between the wireless communication system and an operator.

14. The system of claim 1, wherein only the primary components are part of an active communication path between a network and one or more customers.

15. A method of providing redundancy for a wireless communication system base station comprising both primary components and standby components, the method comprising:

monitoring the operation of a plurality of primary modem interface cards, each configured to modulate and demodulate data between the base station and one or more customers in a sector;

detecting a fault condition in one of the plurality of primary modem interface cards;

routing data away from one of the plurality of primary modem interface cards associated with the fault condition to a standby modem interface card; and selecting one from a plurality of standby outdoor units to transmit and receive data between the standby modem interface card and the one or more customers in the sector.

16. The method of claim 15, further comprising performing fault correlation to determine the severity of the fault condition to the wireless communication system.

17. The method of claim 16, wherein performing fault correlation includes determining whether the fault condition is shared by more than one of the plurality of primary modem interface cards.

18. The method of claim 15, wherein a fault message originates from one of a plurality of fault bus processors, each coupled to and configured for monitoring one of the plurality of primary modem interface cards and its associated one of the plurality of primary outdoor units.

19. The method of claim 15, wherein the fault condition is detected in response to polling.

20. The method of claim 15, wherein the fault condition is sent from one of the plurality of primary modem interface cards.

21. The method of claim 15, wherein selecting one from the plurality of standby outdoor units is based on a correlation between the sector which is associated with the one of the plurality of primary modem interface cards that originated the fault condition and the one of the plurality of standby outdoor units which transmits and receives in the same sector.

22. The method of claim 15, further comprising:

resetting the one of the plurality of primary modem interface cards associated with the fault condition;

disconnecting the one or more customers from the one of the plurality of primary modem interface cards associated with the fault condition;

deregistering the one or more customers from the one of the plurality of primary modem interface cards associated with the fault condition;

recovering the link with the one or more customers through the standby modem interface card; and registering the one or more customers.

23. A wireless communication system base station comprising both primary components and standby components for transmitting and receiving data in a plurality of sectors in a coverage area, the system comprising:

a plurality of pairs of primary modem interface cards and primary outdoor units configured to modulate and transmit and receive and demodulate data between the base station and one or more customers;

a first standby modem interface card configured to modulate/demodulate data transmitted between the base station and the one or more customers;

a plurality of standby outdoor units configured to transmit and receive data between the first standby modem interface card and the one or more customers;

a selectable switch configured to connect one of the plurality of standby outdoor units to the first standby modem interface card; and a processor connected to the selectable switch and configured to select one of the plurality of standby outdoor units for transmitting and receiving data between the one or more customers and the first standby modem interface card such that data communication is maintained between the one or more customers and the base station when one of the plurality of pairs of primary interface cards and primary outdoor units has failed.

24. The system of claim 23, wherein each of the plurality of pairs of primary modem interface cards and primary outdoor units includes an upconverter, a down converter, and an antenna for transmitting and receiving modulated data and a modem and a communications processor for modulating and demodulating data.

25. The system of claim 23, further comprising a backhaul interface configured to route data between a backhaul and both the plurality of pairs of primary modem interface cards and primary outdoor units and the first standby modem interface card.

26. The system of claim 23, further comprising a test management module configured to periodically test the connections between the selectable switch and the plurality of standby outdoor units.

27. The system of claim 23, wherein each of the plurality of pairs of primary modem interface cards and primary outdoor units includes a fault bus processor configured to monitor the operation of one of the plurality pairs of primary modem interface cards and primary outdoor units.

28. The system of claim 27, further comprising a redundancy management module configured to determine whether the first standby modem interface card and one of the plurality of outdoor units should replace one of the plurality of pairs of primary modem interface cards and primary outdoor units based on a received fault message from the fault bus processor.

29. The system of claim 23, further comprising a redundancy management module configured to determine whether the first standby modem interface card and one of the plurality of outdoor units should replace one of the plurality of pairs of primary modem interface cards and primary outdoor units based on a received fault message from one of the plurality of pairs of primary modem interface cards and primary outdoor units.

30. The system of claim 29, wherein only the primary components are part of an active communication path between a network and one or more customers.

31. A wireless communication system base station comprising both primary components and standby components for transmitting and receiving data in a plurality of sectors in a coverage area, the system comprising:
 a plurality of primary modem interface cards configured to modulate and demodulate data;
 a plurality of primary outdoor units, each coupled to one of the plurality of primary modem interface cards and configured to transmit and receive modulated data between one of the plurality of primary modem interface cards and one of a plurality of sectors in a coverage area;
 a first standby modem interface card configured to replace more than one of the plurality of primary modem interface cards;
 a plurality of standby outdoor units, each configured to transmit and receive modulated data between the first standby modem interface card and one of the plurality of sectors in the coverage area;
 a controller interface card configured to select one of the plurality of standby outdoor units to replace one of the plurality of primary outdoor units;
 a redundancy card coupled to a selectable switch such that both are configured to route data between the first standby modem interface card and the selected one of the plurality of standby outdoor units;
 a test management module configured to test the connections between the redundancy card and the plurality of standby outdoor units;
 a network management system module configured to provide an interface between the wireless communication system and an operator; and
 a backhaul interface configured to route data between a backhaul and both the plurality of primary modem interface cards and the first standby modem interface card.

32. The system of claim 31, wherein each of the plurality of outdoor units comprises an upconverter, a down converter, and an antenna for transmitting and receiving modulated data.

33. The system of claim 31, wherein each of the plurality of primary modem interface cards comprises a modem and a communications processor for modulating and demodulating data.

34. The system of claim 31, further comprising a test management module configured to periodically test the connections between the redundancy card and the plurality of standby outdoor units.

35. The system of claim 31, wherein each of the plurality of primary modem interface cards includes a fault bus processor configured to monitor the operation of one of the plurality of primary modem interface cards and its associated one of the plurality of primary outdoor units.

36. The system of claim 35, further comprising a redundancy management module configured to determine whether the first standby modem interface card should replace one of the primary modem interface cards based on a received fault message from the fault bus processor.

37. The system of claim 31, further comprising a redundancy management module configured to determine whether the first standby modem interface card should replace one of the primary modem interface cards based on a received fault message from one of the primary modem interface cards indicating one of the plurality of primary outdoor units has failed.

38. The system of claim 31, wherein the plurality of primary modem interface cards includes four primary modem interface cards and the plurality of primary outdoor units includes four primary outdoor units.

39. The system of claim 31, wherein the plurality of standby outdoor units includes four standby outdoor units.

40. The system of claim 31, wherein the plurality of primary modem interface cards includes eight primary modem interface cards and the plurality of standby outdoor units includes eight standby outdoor units.

41. The system of claim 40, further comprising a second standby modem interface card configured to modulate and demodulate data and to replace a failed one of the plurality of primary modem interface cards.

42. The system of claim 31, further comprising a network management system module configured to provide an interface between the wireless communication system and an operator.

43. The system of claim 31, wherein the plurality of standby outdoor units includes a standby outdoor unit for each of the plurality of sectors in the coverage area.

44. A wireless communication system base station comprising both primary components and standby components for transmitting and receiving data in a plurality of sectors in a coverage area, the system comprising:
 a plurality of primary modems configured to modulate and demodulate data;

a plurality of primary transceivers, each coupled to one of the plurality of primary modems and configured to transmit and receive modulated data between one of the plurality of primary modems and one of a plurality of sectors in a coverage area;

a first standby modem configured to replace one of the plurality of modems;

a plurality of standby transceivers, each configured to transmit and receive modulated data between the first standby modem and one of the plurality of sectors in the coverage area;

a controller interface card configured to select one of the plurality of standby transceivers associated with a failed one of the plurality of primary modems;

a redundancy card configured to route data between the first standby modem and the selected one of the plurality of standby transceivers;

a test management module configured to test the connections between the redundancy card and the plurality of standby transceivers;

a network management system module configured to provide an interface between the wireless communication system and an operator; and a selectable switch located within the redundancy card and configured to connect the first standby modem with the selected one of the plurality of standby transceivers.

45. The system of claim 44, wherein the redundancy card comprises a processor coupled to a switch matrix for routing data between the first standby modem and one of the plurality of standby transceivers.

46. The system of claim 44, wherein each of the plurality of primary transceivers comprises an upconverter and an antenna for transmitting and receiving modulated data.

47. The system of claim 44, wherein each of the plurality of primary modems comprises a modem and a communications processor for modulating and demodulating data.

48. The system of claim 44, further comprising a backhaul interface configured to route data between the plurality of primary modems and the first standby modem.

49. The system of claim 44, further comprising a test management module configured to periodically test the connections between the redundancy card and the plurality of standby transceivers.

50. The system of claim 44, wherein each of the plurality of primary modems includes a fault bus processor configured to monitor the operation of one of the plurality of primary modems and its associated one of the plurality of primary transceivers.

51. The system of claim 50, further comprising a redundancy management nodule configured to determine whether the first standby modem should replace one of the primary modems based on a received fault message from the fault bus processor.

52. The system of claim 44, further comprising a redundancy management nodule configured to determine whether the first standby modem should replace one of the primary modems based on a received fault message from one of the plurality of primary modems indicating one of the plurality of primary transceivers has failed.

53. The system of claim 44, wherein the plurality of primary modems includes four primary modems and the plurality of primary transceivers includes four primary transceivers.

54. The system of claim 44, wherein the plurality of standby transceivers includes four standby transceivers.

55. The system of claim 54, further comprising a second standby modem configured to modulate and demodulate data and to replace more than one of the plurality of primary modems.

56. The system of claim 44, wherein the plurality of primary modems includes eight primary modems and the plurality of standby transceivers includes eight standby transceivers.

57. The system of claim 44, further comprising a network management system module configured to provide an interface between the wireless communication system and an operator.

58. The system of claim 44, wherein only the primary components are part of an active communication path between a network and one or more customers.

59. A method for use in a wireless communication system base station having a plurality of active modem interface cards, a plurality of active outdoor units which are each coupled to one of the plurality of active modem interface cards, a first inactive modem interface card configured to replace a failed one of the plurality of active modem interface cards and switchably coupled to a plurality of inactive outdoor units, a controller interface card configured select one of the plurality of inactive outdoor units associated with a failed one of the plurality active outdoor units, a redundancy card configured to route data between the first inactive modem interface card and the selected one of the plurality of inactive outdoor units, the method comprising:

monitoring the operation of the plurality of active modem interface cards by the controller interface card;

detecting a fault condition in one of the plurality of active modem interface cards;

routing data away from one of the plurality of active modem interface cards associated with the fault condition to the inactive modem interface card; and selecting one from the plurality of inactive outdoor units to transmit and receive data from the inactive modem interface card through the redundancy card and to one or more customers.

60. The method of claim 59, further comprising performing fault correlation to determine the severity of the fault condition to the wireless communication system.

61. The method of claim 60, wherein performing fault correlation includes determining whether the fault condition is shared by more than one of the plurality of active modem interface cards.

62. The method of claim 60, wherein a fault message originates from one of a plurality of fault bus processors, each coupled to and configured for monitoring one of the plurality of active modem interface cards and its associated one of the plurality of active outdoor units.

63. The method of claim 59, wherein the fault condition is detected in response to polling.

64. The method of claim 59, wherein the fault condition is sent from one of the plurality of active modem interface cards.

65. The method of claim 59, wherein selecting one from the plurality of inactive outdoor units is based on a correlation between the sector which is associated with the one of the plurality of active modem interface cards that originated the fault condition and the one of the plurality of inactive outdoor units which transmits and receives in the same sector.

66. The method of claim 58, further comprising:

resetting the one of the plurality of active modem interface cards associated with the fault condition;

disconnecting the one or more customers from the one of the plurality of active modem interface cards associated with the fault condition;

deregistering the one or more customers from the one of the plurality of active modem interface cards associated with the fault condition;

recovering the link with the one or more customers through the inactive modem interface card; and registering the one or more customers.

* * * * *